United States Patent [19]

Kiya et al.

[11] Patent Number: 5,019,913

[45] Date of Patent: May 28, 1991

[54] RECORDING APPARATUS HAVING CONTROL DATA SELECTIVELY DESIGNATED IN MEMORY WHICH CORRESPONDS TO ONE OF MULTIPLE OPTICAL SCANNING SYSTEMS

[75] Inventors: Yukitoshi Kiya, Kawasaki; Takahiro Yagishita; Masayoshi Miyamoto, both of Yokohama; Kazuyuki Shimada, Chofu; Hideo Azumai; Yoshiharu Niito, both of Yokohama; Keiichi Iwasaki, Suita, all of Japan

[73] Assignee: Ricoh Company, Ltd., Tokyo, Japan

[21] Appl. No.: 589,197

[22] Filed: Sep. 27, 1990

[30] Foreign Application Priority Data

Oct. 2, 1989 [JP] Japan .................................. 1-257399
Oct. 3, 1989 [JP] Japan .................................. 1-258610
Jun. 18, 1990 [JP] Japan .................................. 2-157671

[51] Int. Cl.[5] ...................... H04N 1/23; G01D 15/14; G02B 26/10; G02F 1/29
[52] U.S. Cl. .................... 358/296; 346/108; 346/160
[58] Field of Search ............. 358/296, 300, 302; 346/108, 160; 364/518, 519; 350/6.1, 6.5

[56] References Cited

U.S. PATENT DOCUMENTS 4,809,032 2/1989 Nakatomi .............................. 346/160
4,814,792 3/1989 Yamanobe ............................ 346/108

FOREIGN PATENT DOCUMENTS 62-32768 2/1987 Japan .

Primary Examiner—Benjamin R. Fuller
Assistant Examiner—Scott A. Rogers
Attorney, Agent, or Firm—Cooper & Dunham

[57] ABSTRACT

An image recording apparatus includes an image recording media, an optical scanning system selected from among predetermined different optical scanning systems, a first memory for storing a plurality of sets of control data respectively provided for the different optical scanning systems, a switch for specifying one of the predetermined different optical scanning systems provided in the image recording apparatus, and a second memory for storing one of the sets of control data corresponding to the optical scanning system selected from among the predetermined different optical scanning systems. Also, the apparatus includes a main scan controller which generates predetermined timing signals related to the one of the sets of control data stored in the second memory, and a control part for generating a control signal from the one of the sets of control data and the predetermined timing signals and for controlling the optical scanning system on the basis of the control signal so that the optical scanning system actually provided in the image recording apparatus has an optical characteristic based on the one of the sets of control data related to the optical scanning system actually provided in the image recording apparatus.

11 Claims, 19 Drawing Sheets

POLYGON MIRROR HAVING CURVED SURFACES

ROTATING DEFLECTOR & FLAT LENS

GALVANO MIRROR

ROTATING DEFLECTOR & Fθ LENS

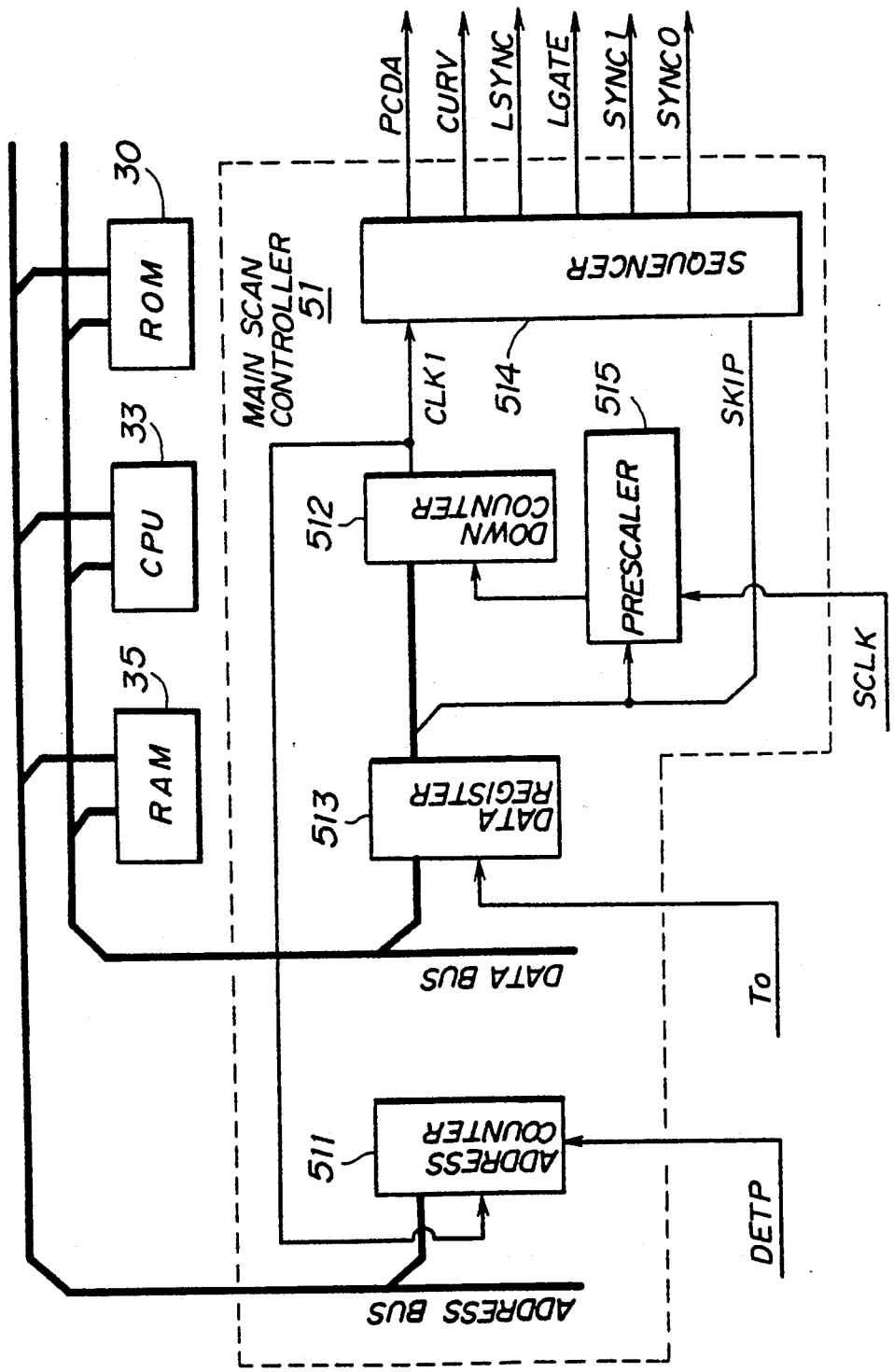

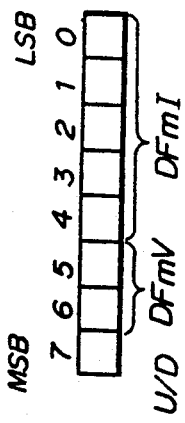
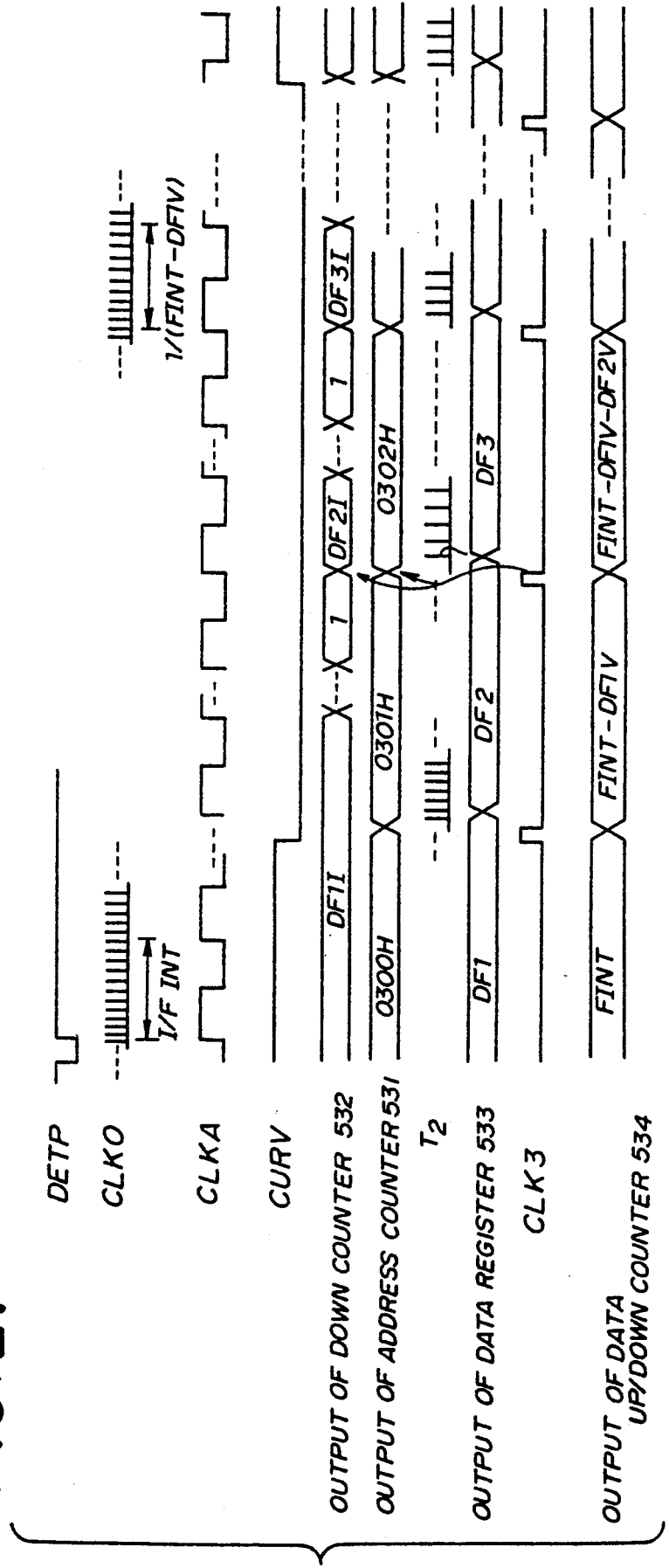

RECORDING APPARATUS HAVING CONTROL DATA SELECTIVELY DESIGNATED IN MEMORY WHICH CORRESPONDS TO ONE OF MULTIPLE OPTICAL SCANNING SYSTEMS

BACKGROUND OF THE INVENTION

The present invention generally relates to an image recording apparatus, such as a laser beam printer or a digital copying machine.

In such an image recording apparatus, a laser diode is turned ON/OFF in accordance with a video signal synchronized with an image clock signal (WCLK). A laser beam emitted from the laser diode scans an image forming media (which is generally formed of a drum-shaped or belt-shaped photosensitive member) in a main scanning direction. Thereby, an image is recorded on the image forming media by the laser beam.

The laser beam emitted from the laser diode is deflected by an optical scanning system and then projected onto the image forming media. An example of the optical scanning system is a polygonal mirror having a plurality of mirror surfaces. The laser beam emitted from the polygon mirror is successively deflected by the mirror surfaces in the main scanning direction and then projected onto the image forming media, which is moved in a sub scanning direction perpendicular to the main scanning direction.

In this case, the polygon mirror deflects the laser beam at an equal angular speed so that the laser beam moves on the image recording media at a constant speed. In order to realize such a scan, an $f\theta$ lens is used together with the polygon mirror.

However, an $f\theta$ lens is a special lens which is large in size and expensive. For this reason, recently, an optical scanning system which does not use an $f\theta$ lens has been proposed (see Japanese Laid-Open Patent Application No. 62-32768). In an optical scanning system which odes not use an $f\theta$ lens, the laser beam does not move on the image forming media at a constant speed. Thus, if a frequency $f_k$ of a pixel clock used for use in the image scan is constant, the image recorded on the image recording media will deteriorate.

In order to eliminate this problem, it is necessary to change the frequency $f_k$ of the pixel clock in accordance with a change of the scanning speed of the laser beam obtained on the image recording media. More specifically, the frequency $f_k$ of the pixel clock is increased when the laser beam is moving on the image recording media at a high speed. On the other hand, the frequency $f_k$ of the pixel clock is decreased when the laser beam is moving on the image recording media at a low speed.

The frequency $f_k$ of the pixel clock is an inverse number of a time T necessary to write or read one pixel. Thus, a change of the frequency $f_k$ changes the time T. Thus, assuming that the amount of the laser beam projected on the image recording media is constant, the amount of exposure per one pixel obtained when the laser beam is moving at a high speed is different from that obtained when it is moving at a low speed. This means that the image density changes as the scanning speed changes.

Conventionally, in order to prevent the occurrence of a change of the image density, a drive current which is applied to the laser diode is changed in accordance with a change of the frequency $f_k$ of the pixel clock. With this arrangement, the amount of light emitted from the laser diode (emission power) is changed in accordance with a change of the frequency $f_k$ of the pixel signal.

Conventionally, timing signals usually labeled PCDA, CURV, LSYNC, LGATE, SYNC1 and SYNC0 are used during one scanning period. The signal PCDA indicates the scanning period of an effective printing area on the photosensitive member. The signal CURV indicates a section in which the image clock frequency is modulated and the laser diode emission power is modulated. The signal LSYNC indicates a synchronization timing at which a video signal is output to a print data processor. The signal LGATE is a scanning period during which period the print area is scanned in the main scanning direction. The signal SYNC1 indicates an edge scanning timing of the polygon mirror. The signal SYNC0 indicates a laser diode emission timing for a synchronizing signal.

FIG. 1 is a block diagram of a conventional circuit which generates the above-mentioned timing signals. A reference clock generator 70 generates a reference clock SCLK. A counter 71 counts the reference clock SCLK, and is reset by a beam detection signal DETP used for establishing the synchronization of the scanning operation. The content of the counter 71 is decoded respectively by a group of six decoders 72. The decoders decode respective count values of the counter 71 and respectively generate the timing signals PCDA, CURV, LSYNC, LGATE, SYNC1 and SYNC0.

FIG. 2 illustrates the relationship among the timing signals. As shown in FIG. 2, periods T1-T9 are fixed. If a single image recording apparatus is designed to realize different resolution levels and/or different image recording speeds and/or to change the printing area in the main scanning direction for every page, it is necessary to provide for a large number of decoders. This needs a large-size circuit and increases the production cost.

Further, light amount modulation data used for changing the amount of light emitted from the laser diode and frequency modulation data used for changing the frequency $f_k$ of the pixel clock are fixed and generated by a pull-up or pull-down operation of input terminals of an integrated circuit (IC) device or stored in a ROM. Thus, it is necessary to change the status of the input terminals or replace the ROM in order to change the amount of light emitted from the laser diode or the frequency $f_k$ of the pixel clock.

SUMMARY OF THE INVENTION

It is a general object of the present invention to provide an improved image recording apparatus in which the above-mentioned disadvantages are eliminated.

A more specific object of the present invention is to provide an image recording apparatus in which the generation timings of the timing signals necessary for the main scan by the laser beam are arbitrarily changed by a simple circuit so that different resolution levels, image recording speeds and/or printing areas in the main scanning direction can be easily realized.

Another object of the present invention is to provide an image recording apparatus in which the light amount modulation data and/or the frequency modulation data can be easily changed so that the distribution of light emitted from the laser diode or the frequency of the pixel clock can be controlled arbitrarily.

The above-mentioned objects of the present invention are achieved by an image recording apparatus comprising:

an image recording media;

an optical scanning system which projects a light beam corresponding to an image to be recorded onto the image recording media and which records the image on the image recording media, the optical scanning system actually provided in the image recording apparatus being one optical scanning system selected from among predetermined different optical scanning systems;

first memory means for storing a plurality of sets of control data respectively provided for the predetermined different optical scanning systems;

setting means, coupled to the first memory means, for specifying one of the predetermined different optical scanning systems provided in the image recording apparatus;

second memory means, coupled to the first memory means and the setting means, for reading out one of the sets of control data corresponding to the optical scanning system selected from among the predetermined different optical scanning systems and for storing the one of the sets of control data;

main scan controller means, coupled to the second memory means, for generating predetermined timing signals related to the one of the sets of control data stored in the second memory means; and control means, coupled to the optical scanning system, the second memory means and the main scan controller means, for generating a control signal from the one of the sets of control data and the predetermined timing signals and for controlling the optical scanning system on the basis of the control signal so that the optical scanning system actually provided in the image recording apparatus has an optical characteristic based on the one of the sets of control data related to the optical scanning system actually provided in the image recording apparatus.

BRIEF DESCRIPTION OF THE DRAWINGS

FIG. 13 is a block diagram illustrating the structure of a main scan controller shown in FIG. 11;

FIG. 26 is a diagram illustrating a format of the frequency modulator data stored in the RAM shown in FIG. 25;

FIG. 27 is a time chart illustrating the operation of the frequency modulator shown in FIG. 25.

DESCRIPTION OF THE PREFERRED EMBODIMENT

A description will now be given of an image recording apparatus according to a preferred embodiment of the present invention.

Figure 3:
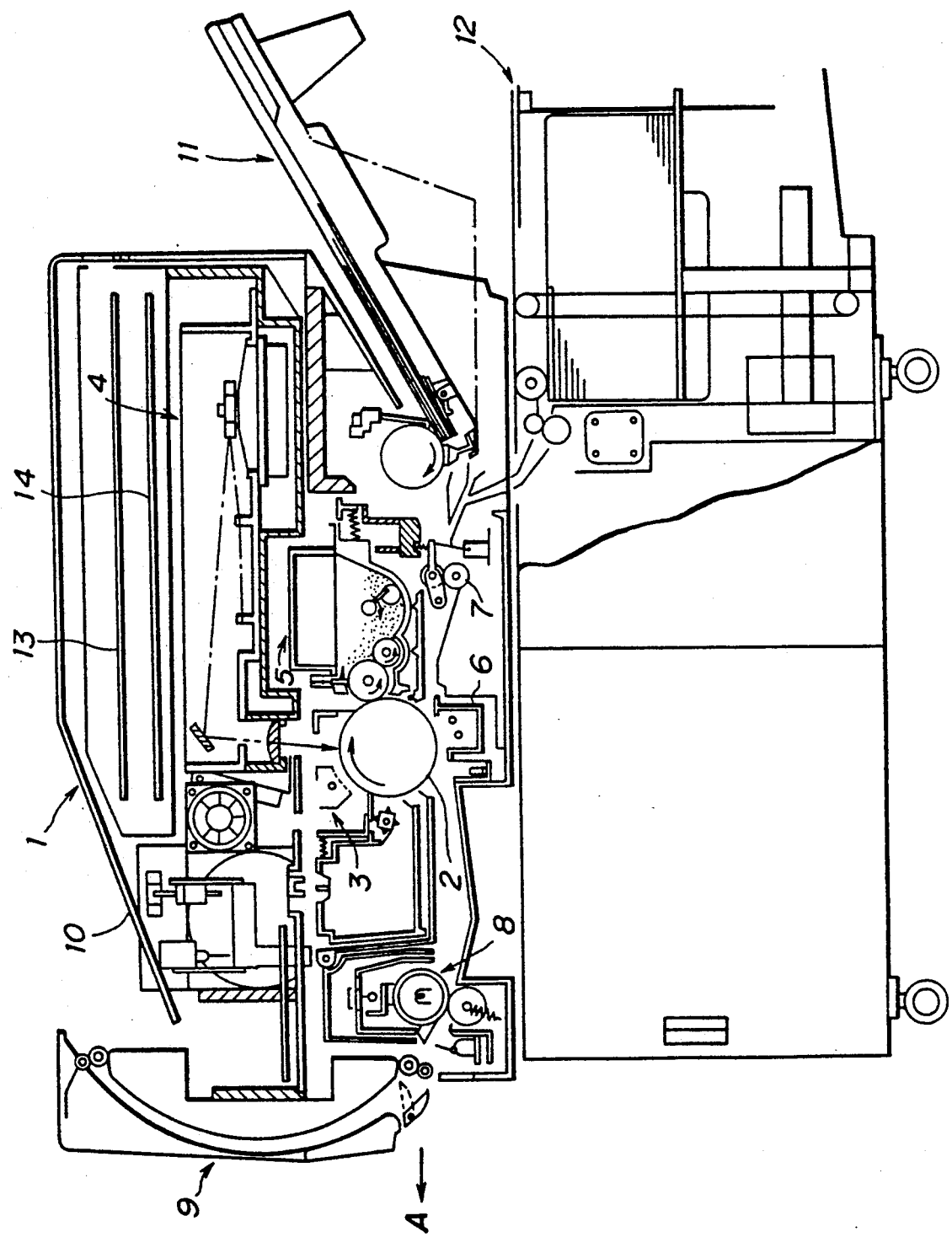
FIG. 3 is a diagram illustrating the outline of a laser beam printer according to a preferred embodiment of the present invention.

Referring to FIG. 3, there is illustrated an image recording apparatus according to the first embodiment of the present invention, that is, a laser beam printer. A laser beam printer 1 is mounted on a large-capacity paper supply unit 12 which provides a large number of sheets of paper. In response to a print instruction, a photosensitive member of a drum shape (hereinafter referred to as a photosensitive drum) 2 serving as an image recording media is rotated in the direction of the arrow shown in FIG. 3 (corresponding to a sub scanning direction) by means of a main motor (not shown in FIG. 3) coupled to a shaft of the photosensitive drum 2. During the rotation of the photosensitive drum 2, a main charger 3 negatively electrifies a circumferential surface of the photosensitive drum 2 uniformly. A laser scanning unit 4 emits a laser beam, which is turned ON/OFF in accordance with a video signal. The laser beam is projected onto the photosensitive drum 2 and moved in a main scanning direction, so that the surface thereof is exposed and an electrostatic latent image is formed thereon.

A developer 5 supplies an area having no charge or a reduced negative charge with toner particles. Thereby, a toner image is formed on the surface of the photosensitive drum 2, and transferred, by a transfer/charge removing unit 6, to a recording sheet of paper which is transported at a predetermined timing by means of a pair of registration rollers 7.

The recording sheet of paper is separated from the photosensitive drum 2, and passes on a fixing unit 8, which applies a pressure to the recording sheet of paper while it is being heated. Thereby, the toner image on the recording sheet is fixed thereon, and then ejected outside of the image recording apparatus in the direction of the arrow A or ejected to an eject tray 10 via an ejection transport path 9.

The recording sheet is fed one by one from either a paper supply tray 11 or the large-capacity paper unit 12. The transport of the recording sheet is temporarily stopped at a position where the leading end thereof is held by the pair of registration rollers 7. Then, at a predetermined timing, the registration rollers 7 are driven again and the recording sheet is transported to a position in the vicinity of the photosensitive drum 2 opposite to the transfer/charge removing charger 6. In an upper portion of the laser beam printer 1, there are accommodated a printed circuit board on which a data controller 13 which controls the entire laser beam printer 1 is formed, as well as a printed circuit board on which a device controller 14 is formed.

Figure 4:
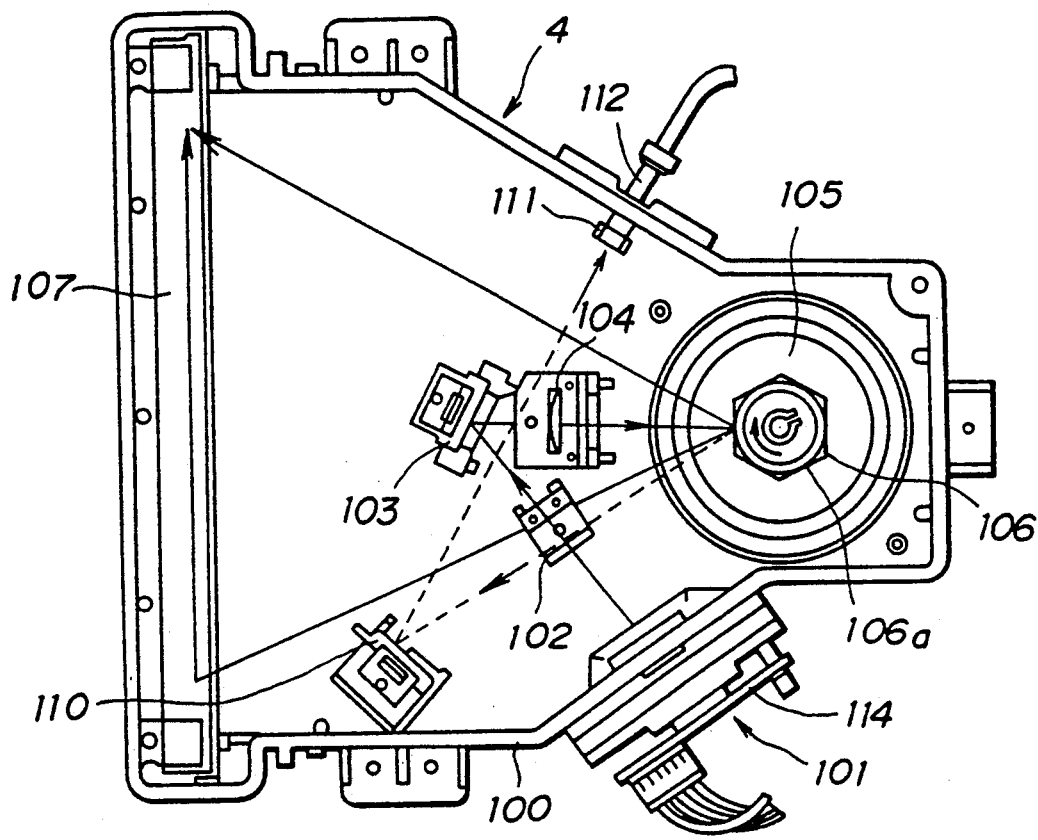
FIGS. 4 and 5 are respectively flat view and perspective view of a laser scan unit shown in FIG. 3.
Figure 5:
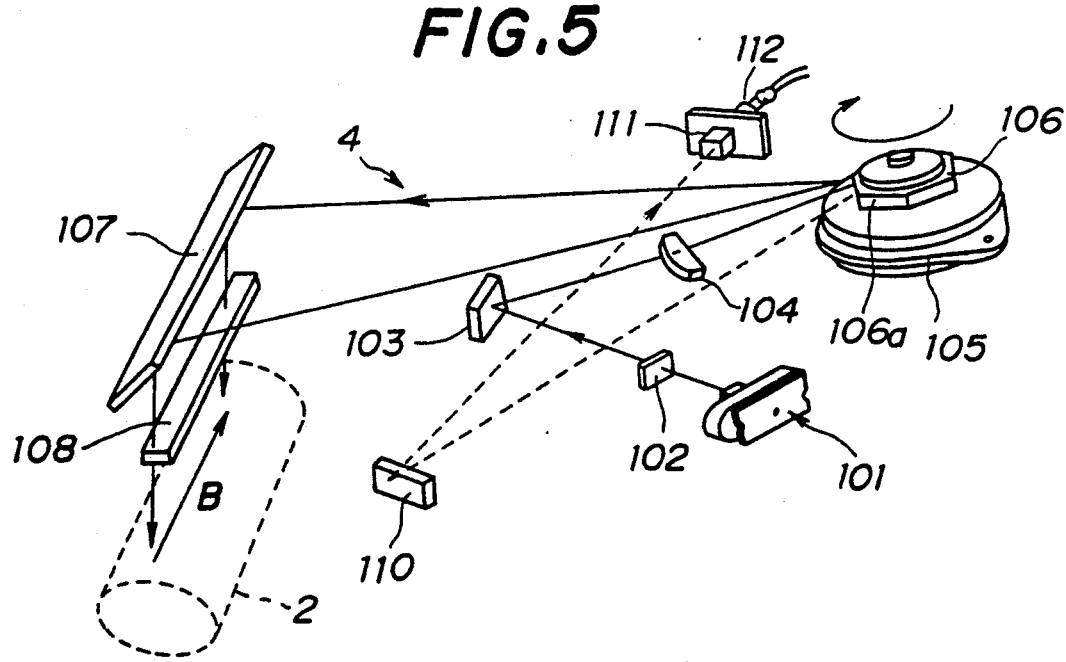

Referring to FIGS. 4 and 5, there are illustrated the laser scanning unit 4 shown in FIG. 3. The laser scanning unit 4 is composed of a laser diode (LD) unit 101, a first cylindrical lens 102, a first mirror 103, a spherical lens 104, a motor 105, a polygon mirror 106, a second mirror 107, a third mirror 110 and a synchronization detection sensor 111. The LD unit 101 is attached to a side surface of a case 100. The first cylindrical lens 102 is mounted on a substantially center portion of a bottom surface of the case 100. The motor 105 is mounted on a rear portion of the bottom surface of the case 100. The motor 105 rotates the polygon mirror 106 at a constant speed in the direction indicated by the arrow. The second mirror 107 is fixed to a front surface of the case 100. The third mirror 110 is mounted to a side portion of the bottom surface of the case 100. The synchronization detection sensor 111, which is formed of, for example, a photosensor, is mounted on a side portion of the bottom surface of the case 100.

The LD unit 101 is composed of a laser diode, a collimating lens and an aperture member, which are integrally assembled. Further, the LD unit 101 includes a printed circuit board 114 on which a part of an automatic power control (APC) circuit which controls the output of the laser diode. A monitor photodiode which receives light backward emitted from the laser diode is integrally formed in the laser diode.

The first cylindrical lens 102 shapes the laser beam emitted from the LD unit 101 into a desired shape on the photosensitive drum 2 in the sub scanning direction. The spherical lens 104 converges the laser beam reflected by the first mirror 103 and inflects the converged laser beam upward at about 5°. The deflected laser beams is projected onto a mirror surface 106a of the polygon mirror 106.

The polygon mirror 106 has a plurality of mirror surfaces 106a, each having a curved surface. That is, the polygon mirror 106 is formed of an R polygon mirror. It will be noted that no fθ lens is provided between the polygon mirror 106 and the second mirror 107. That is, the system shown in FIGS. 4 and 5 is a post object type optical deflector. The polygon mirror 106 is rotated at the constant speed by the motor 105, while the laser beam is successively reflected by the mirror surfaces 106a. The angle of the laser beam with respect to the mirror surface 106a increases due to the rotation of the polygon mirror 106. Each time the polygon mirror 106 rotates by an angle of 360°/6, the mirror surface 106a presented to the laser beam is renewed, so that the laser beam is repeatedly deflected.

The second mirror 107 reflects the laser beam (main scanning beam) reflected by the polygon mirror 106 toward the photosensitive drum 2. The third mirror 110 is disposed outside of a scanning area of the laser beam reflected by the polygon mirror 106, and reflects the incident laser beam toward the synchronization detection sensor 111. A connection cable 112 connects the synchronization detection sensor 111 and the device controller 14 and carries a beam detection signal DETP output by the synchronization detection sensor 111 to the device controller 14.

The laser diode emitted from the laser diode of the LD unit 101 is collimated by the collimating lens provided in the LD unit 101, shaped by the aperture member provided therein and emitted therefrom.

The laser beam emitted from the laser scanning unit 4 passes through the first cylindrical lens 102 and is then reflected by the first mirror 103. The reflected laser beam is focused and inflected upward by the spherical lens 104 and then projected onto the mirror surface 106a of the polygon mirror 106. The laser beam is reflected by the mirror surface 106a and further reflected by the second mirror 107. Then, the laser beam passes through the second cylindrical lens 108 and is projected onto the photosensitive drum 2. The polygon mirror 106 rotates in the direction indicated by the arrow shown in FIG. 5, and thus the laser beam serves as the scanning beam which scans the photosensitive drum 2 in direction B (main scan or line scan). The scanning by the laser beam in the direction B is repeatedly carried out each time the mirror surface 106a reflecting the laser beam is renewed.

While the photosensitive drum 2 is rotating in the direction (sub scanning direction) perpendicular to the main scanning direction B, the laser diode of the LD unit 101 is turned ON/OFF in accordance with the video signal. The laser beam emitted from the laser diode selectively removes a charge on the surface of the photosensitive drum 2 in a dot unit, so that an electrostatic latent image is formed on the photosensitive drum 2.

The laser beam reflected by the polygon mirror 106 is projected onto the third mirror 110 before scanning the photosensitive drum 2 and during a period between two successive main scanning procedures (corresponding to the renewal of the mirror surface 106a or line). The laser beam reflected by the third mirror 110 is projected onto the synchronization detection sensor 111. In response to this laser beam, the synchronization detection sensor 111 outputs the beam detection signal DETP to the device controller 14 via the connection line 112. The beam detection signal DETP is used for, for example, a control of the scan starting timing.

A description will now be given of a controller of the laser beam printer according to the preferred embodiment of the present invention. A controller of the laser beam printer includes the data controller 13 and the device controller 14. The data controller 13 processes input information supplied from an operation panel 15, and controls display elements (not shown) mounted on the operation panel 15. Also, the data processor 13 receives image data output by a host computer 16 and transfers the received image data to the device controller 14 if it is needed. Examples of the host computer 16 are a word processor, personal computer, office computer, data processor, workstation and image editing processor.

The device controller 14 is connected to an LD driver 60, the synchronization detection sensor 111 and input/output devices such as sensors, switches, motors and clutches. Examples of the sensors are a paper size sensor, an eject sensor, a registration sensor and a toner end detection sensor. Examples of the motors are a cassette motor and a main motor. Examples of the clutches are a registration clutch and a paper supply clutch. The device controller 14 refers to detection signals from the input/output devices and controls structural elements of a print engine of the laser beam printer 1 (FIG. 3) and the large-capacity paper supply unit 12. If an optional sorter 17, a duplex unit 18 and/or a mail box 19 are/is connected to the device controller 14, it controls them.

A further description will now be given of the device controller 14 with reference to FIG. 7. The device controller 14 comprises an LSI 21 which is designed to carry out a print cycle during which cycle the structural elements of the print engine of the laser beam printer 1 are made active/inactive with respective timings so that an image (visual image) having a predetermined size and an image density is recorded on a sheet of paper.

The LSI 21 is connected to interface buffers 22 and 23, an oscillator 24, a motor driver 25, a clutch driver 26, an output buffer 27, a voltage/current conversion circuit 28 and an input buffer 29. The interface buffers 22 interface with the data controller 13 and the paper supply unit 12, respectively. The oscillator 24 generates a clock signal OSC having a constant frequency by using a crystal vibration element. The motor driver 25 drives the motors such as the main motor and the cassette motor. The clutch driver 26 drives the clutches such as the registration clutch and the paper supply clutch. The output buffer 27 connects the LSI 21 and a high-voltage power source. The voltage/current conversion circuit 28 connects the LSI 21 and the LD driver 60. The input buffer 29 connects the LSI 21 and the sensors and switches.

Further, a ROM 30, a dipswitch group 31 and an EEPROM 32 are connected to the LSI 21. The ROM 30 stores optical scan characteristic compensating data used for compensating for optical scan characteristics and other data in order to adapt the laser beam printer to various laser scanning characteristics.

Figure 8:
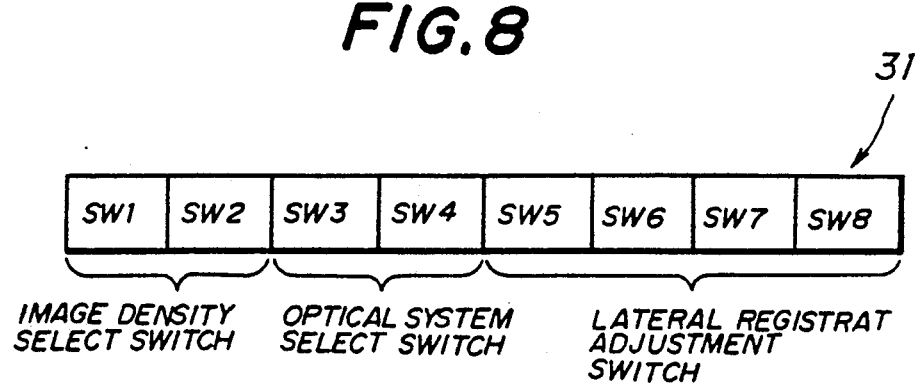
FIG. 8 is a diagram illustrating the structure of a dipswitch shown in FIG. 7.

As shown in FIG. 8, the dipswitch group 31 has a plurality of dipswitches SW1 through SW8. The switches SW1 and SW2 are used for designating a desired image density. The switches SW3 and SW4 are used for specifying optical scan characteristic compensating data corresponding to a selected one of the laser scanning units. For example, the laser scanning unit 4 is replaceably provided. Further, the switches SW5 and SW8 are used for specifying a desired lateral registration adjustment.

Table 1 shows the relationship between the status of the switches SW1 and SW2 and the image density.

TABLE 1

| SW1 | SW2 | Density |
| --- | --- | --- |
| 0 | 0 | 240 DPI |
| 0 | 1 | 300 DPI |

TABLE 1-continued

| SW1 | SW2 | Density |
| --- | --- | --- |
| 1 | 0 | 400 DPI |
| 1 | 1 | 480 DPI |

(DPI: dot per inch)

Table 2 shows the relationship between the status of the switches SW3 and SW4 and optical scanning units.

TABLE 2

| SW3 | SW4 | Units |
| --- | --- | --- |
| 0 | 0 | polygon mirror having curved mirror surface |
| 0 | 1 | combination of a rotating deflector and a flat lens |
| 1 | 0 | Galvano mirror |
| 1 | 1 | combination of a rotating deflector and an fθ lens |

In table 2, the rotating deflector is formed of a rotary polygon mirror or a hologram scanner.

Table 3 shows the relationship between the status of the switches SW4–SW8 and the lateral registration adjustments.

TABLE 3

| SW5 | SW6 | SW7 | SW8 | Lateral adjustment |
| --- | --- | --- | --- | --- |
| 0 | 0 | 0 | 0 | −64 dots |
| 0 | 0 | 0 | 1 | −56 dots |
| 0 | 0 | 1 | 0 | −48 dots |
| 0 | 0 | 1 | 1 | −40 dots |
| 0 | 1 | 0 | 0 | −32 dots |
| 0 | 1 | 0 | 1 | −24 dots |
| 0 | 1 | 1 | 0 | −16 dots |
| 0 | 1 | 1 | 1 | −8 dots |
| 1 | 0 | 0 | 0 | +/−0 dot (center value) |
| 1 | 0 | 0 | 1 | +8 dots |
| 1 | 0 | 1 | 0 | +16 dots |
| 1 | 0 | 1 | 1 | +24 dots |
| 1 | 1 | 0 | 0 | +32 dots |
| 1 | 1 | 0 | 1 | +40 dots |
| 1 | 1 | 1 | 0 | +48 dots |
| 1 | 1 | 1 | 1 | +56 dots |

The minus sign (−) of the lateral registration shows that an image is recorded from a left portion of a sheet deviating from the center of the sheet by a length amounting to dots. The plus sing (+) of the lateral registration shows that an image is recorded from a right portion of a sheet deviating from the center thereof by a length amounting to dots. As described above, in the present invention, it is possible to select any one of the four optical scanning units and the four recording density levels for each of the four optical scanning systems As shown in FIGS. 9A through 9D, the ROM 30 shown in FIG. 7 has four storage areas respectively provided for the four optical scanning units for storing the respective optical scan characteristic compensating data. Each of the four storage areas has sub areas provided for the respective image density levels (240 DPI, 300 DPI and 400 DPI: 480 DPI is omitted for the sake of simplicity). The sub areas of each of the storage areas respectively store main scan control data, optical amount modulation data and frequency modulation data. As has been described previously, optical scan characteristic compensating data related to a desired one of the four optical scanning units can be selected by the switches SW1 through SW4.

Figure 7:
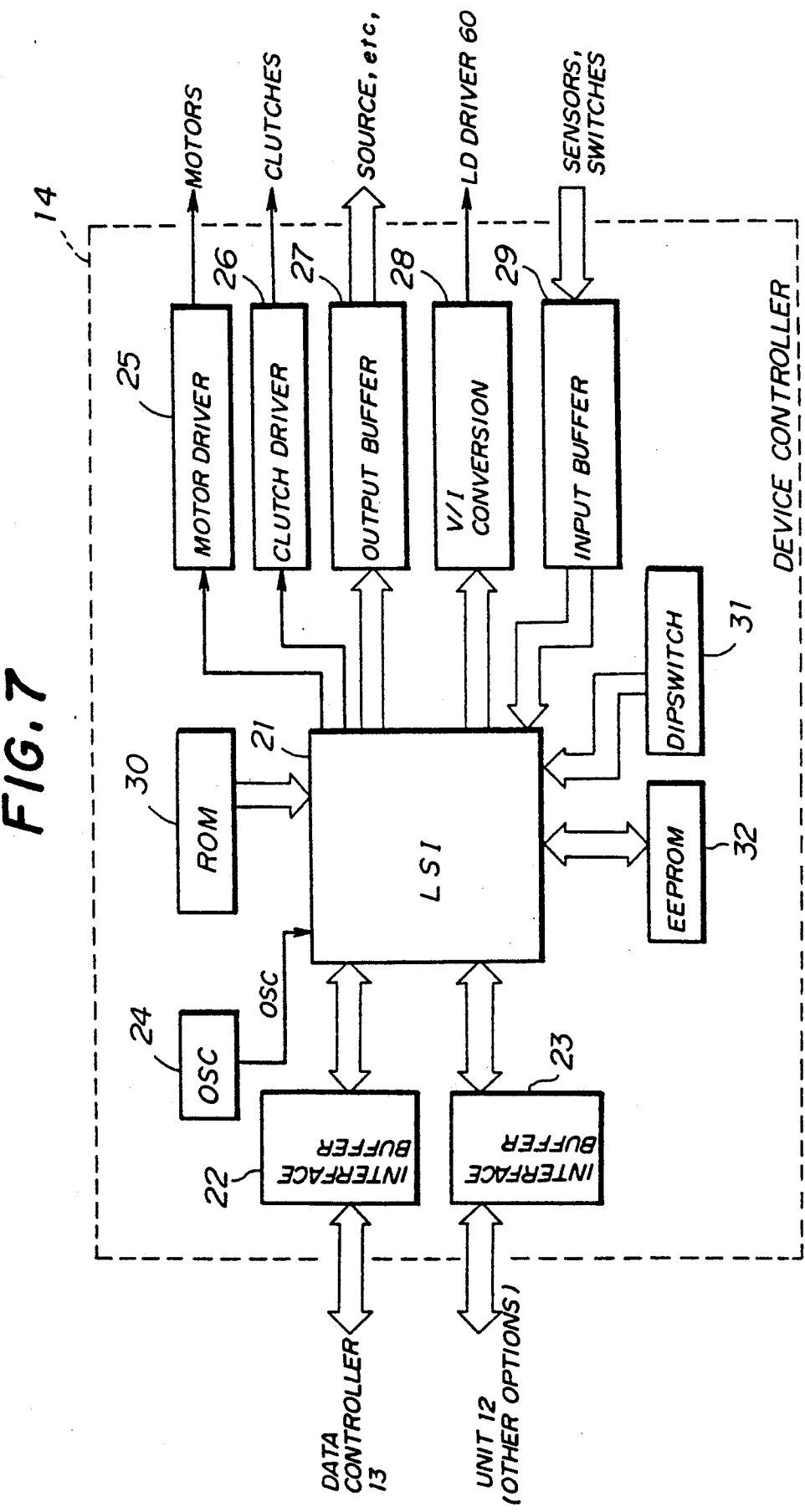
FIG. 7 is a block diagram illustrating a device controller shown in FIG. 6.
Figure 10:
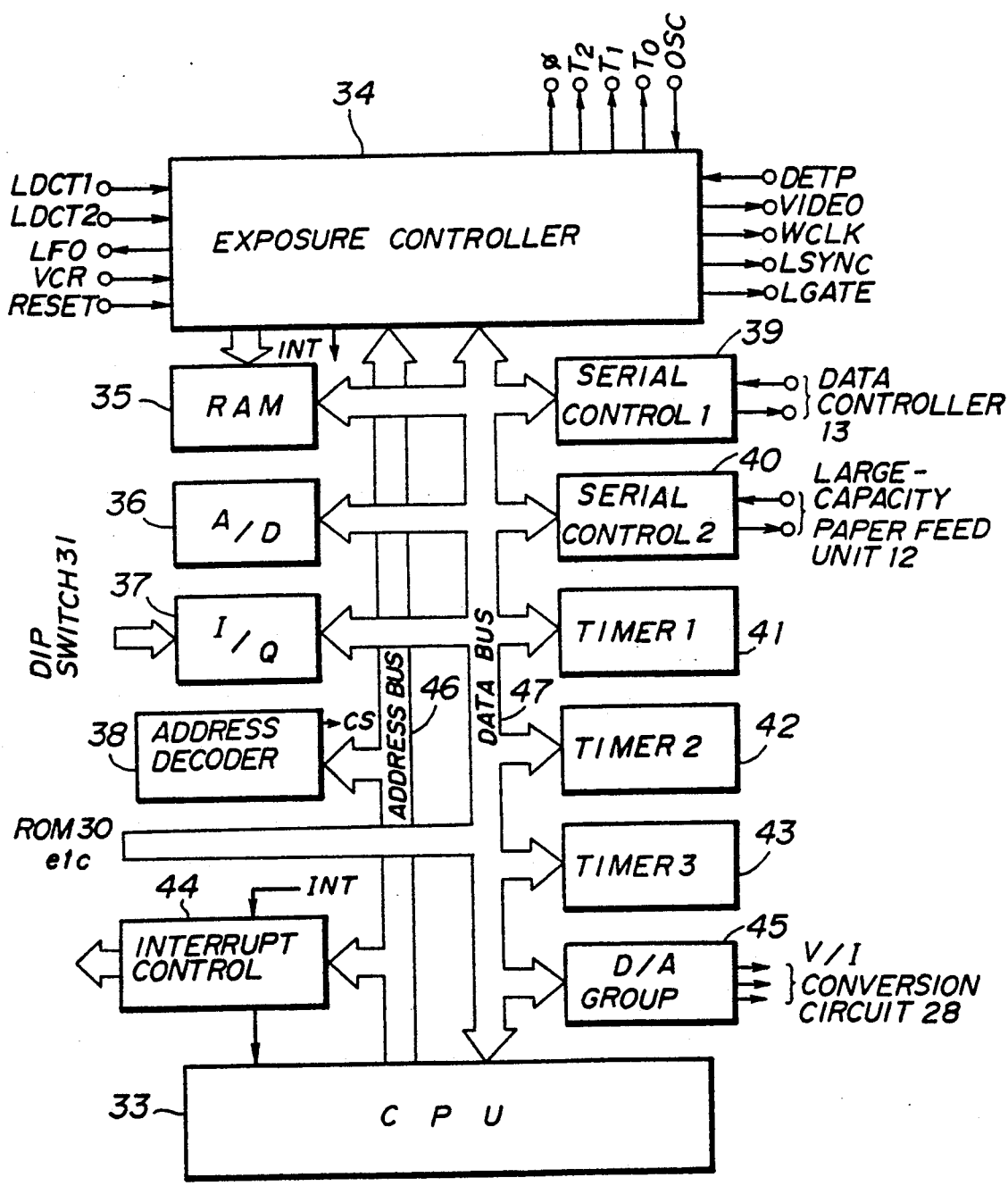
FIG. 10 is a block diagram illustrating the internal structure of an LSI shown in FIG. 7.

FIG. 10 is a block diagram illustrating an internal structure of the LSI 21 shown in FIG. 7. The LSI 21 is composed of a CPU (central processing unit) 33, an exposure controller 34, a RAM 35, an A/D converter 36, an input/output port 37, an address decoder 38, serial interface controllers 39 and 40, timers 41-43, an interrupt controller 44 and a D/A converter group 45. The above structural elements of the LSI 21 are mutually connected via an address bus 46 and a data bus 47, as shown in FIG. 10.

The CPU 33 inputs 8-bit data generated and output by the dipswitch group 31 immediately after the power supply is turned ON, reads out, from the ROM 30 shown in FIG. 7, the corresponding optical scan characteristic compensating data composed of the main scan control data, light amount modulation data and frequency modulation data and writes the readout data into the RAM 35.

Figure 6:
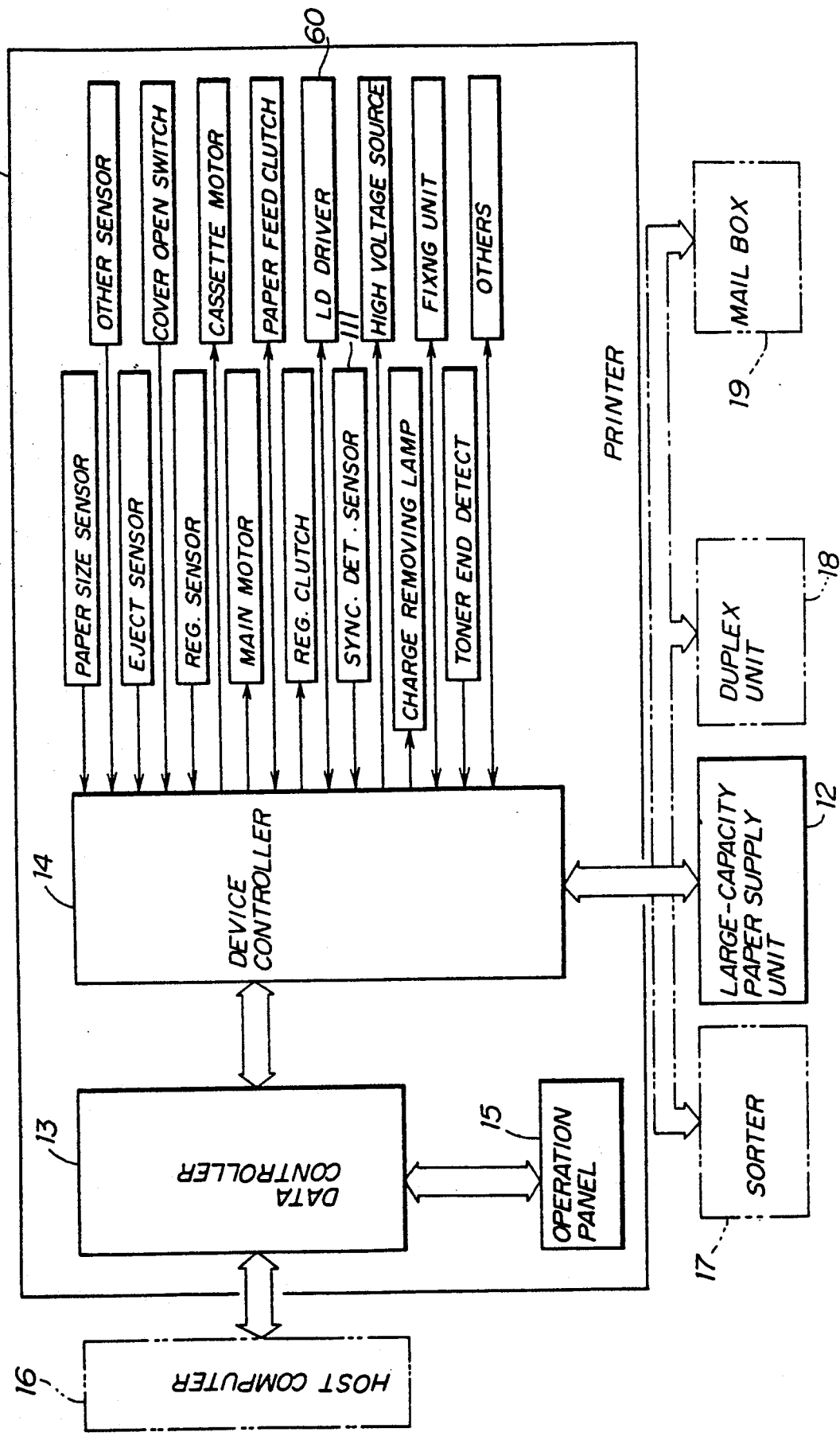
FIG. 6 is a block diagram illustrating a control system of the laser beam printer shown in FIG. 3.

The exposure controller 34 operates in accordance with the data read out from the ROM 30 by the CPU 33. For this purpose, the CPU 33 writes the readout data into an internal register 50 shown in FIG. 11, which will be described later. The exposure controller 34 generates a pixel clock signal WCLK from the data stored in the internal register 50, and determines a reference amount of light emitted from the laser diode. Further, the exposure controller 34 generates a recording start signal related to the main scanning direction on the basis of the main scan control data (count data) read out from the RAM 35. Then, the exposure controller 34 directly outputs a video signal to the LD driver 60 (FIG. 6), and also outputs the light amount control data based on the light amount modulation data read out from the RAM 35 to the LD driver 60 via the D/A converter group 45 and the voltage/current conversion circuits 28 (FIG. 7). Thereby, the light emission timing and emission power of the laser diode are controlled.

Figure 11:
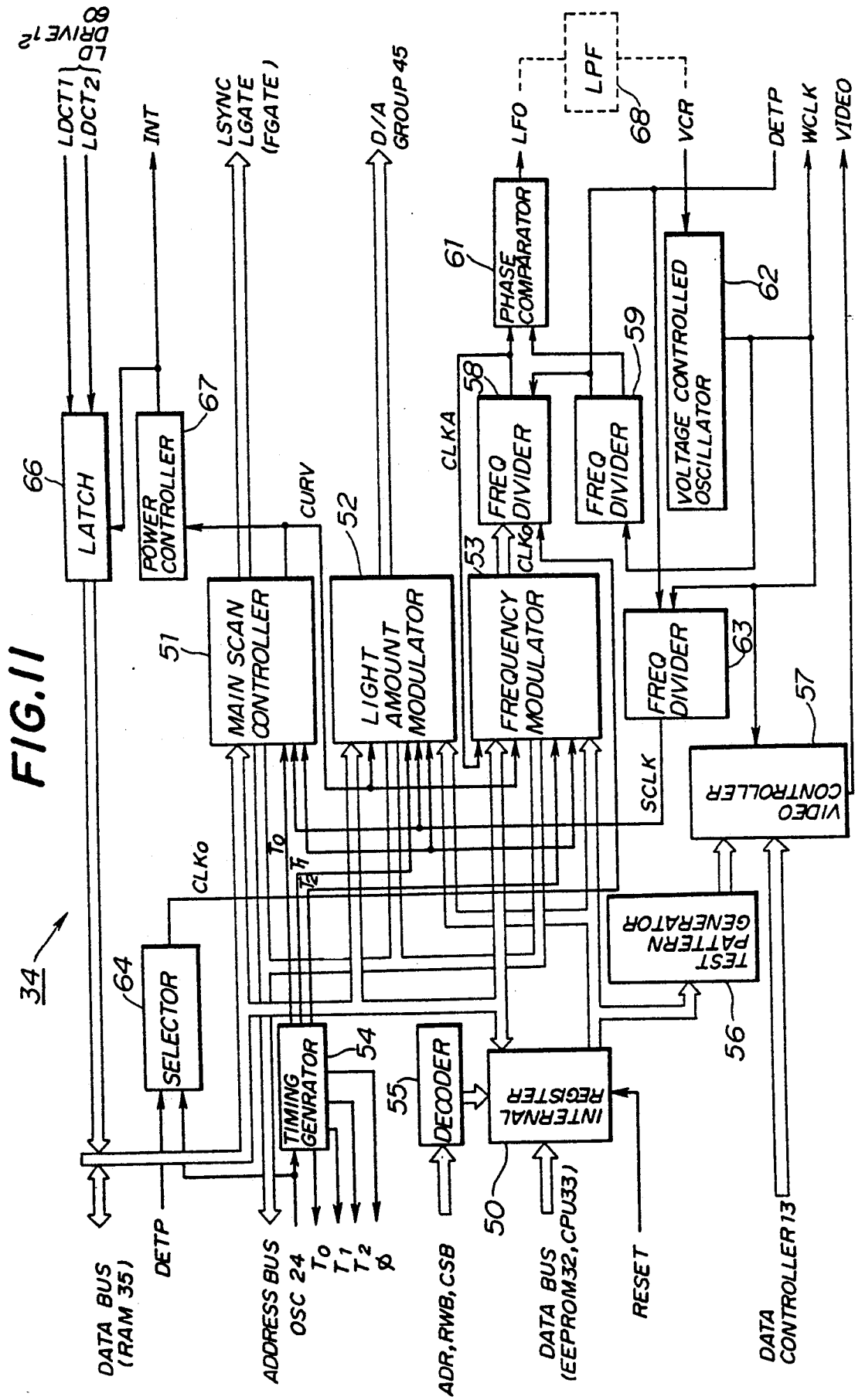
FIG. 11 is a block diagram illustrating the structure of an exposure controller shown in FIG. 10.

FIG. 11 is a block diagram of an internal structure of the exposure controller 34 shown in FIG. 10. A main scan controller 51 generates timing signals such as the aforementioned CURV, LSYNC and LGATE on the basis of the main scan control data read out from the RAM 35. The signal CURV is a modulation start signal, which is kept active during a time when the pixel clock frequency is modulated and the emission power of the laser diode (light amount) is modulated. In response to the signal CURV, a power controller 67 outputs an interrupt signal INT to the interrupt controller 44 shown in FIG. 10. In response to the interrupt signal INT, binary signals LDCT1 and LDCT2 (which will be described later) are output from the LD driver 60 to a latch circuit 66.

A modulation controller 52 outputs the light amount control data based on the light amount modulation data read out from the RAM 35 to the D/A converter group 45 shown in FIG. 10. Thereby, the amount of light emitted from the laser diode is changed. A frequency modulator 53 outputs a signal to a frequency divider 58 so that the frequency divider 58 outputs a PLL (phase locked loop) reference signal CLKA having a frequency written into the internal register 50 by the CPU 33. A decoder 55 decodes addresses ADR, RWB and CSB and specifies an area of the internal register 50. The internal register 50 has data showing the upper and lower limits of the amount of light emitted from the laser diode, data showing a reference frequency of the PLL reference signal CLKA and test pattern data.

A test pattern generator 56 generates a test pattern on the basis of data written into the internal register 50 by the CPU 33. A video controller 57 modulates the test pattern generated and output by the test pattern generator 56 and image data supplied from the data controller 13 in accordance with the output of the main scan controller 51, and generates the aforementioned video signal VIDEO.

The timing generator 54 generates timing signals $\phi$, T0, T1 and T2 from the clock signal OSC generated by the oscillator 24. The timing signal $\phi$ determines a timing at which the exposure controller 34 accesses the RAM 35. The timing signals T0, T1 and T2 determine timings of reading out the main scan control data, light amount modulation data and frequency modulation data from the RAM 35, respectively.

Figure 12:
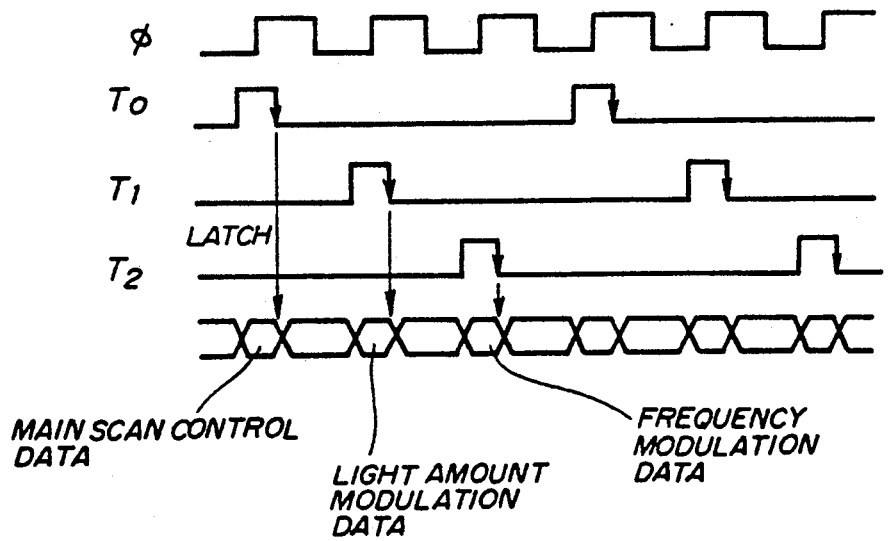
FIG. 12 is a time chart illustrating how to read out main scan control data, light amount modulation data and frequency modulation data from a RAM shown in FIG. 10.
Figure 9D:
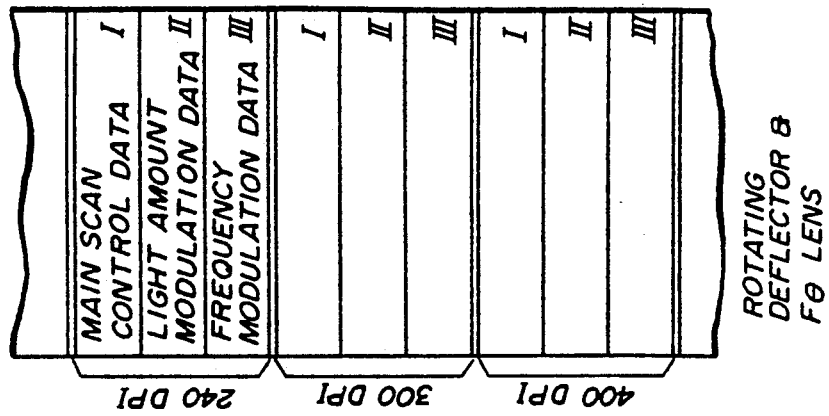
FIGS. 9A, 9B, 9C and 9D are diagrams illustrating how optical scan characteristic compensating data are stored in a ROM shown in FIG. 7.
Figure 9C:
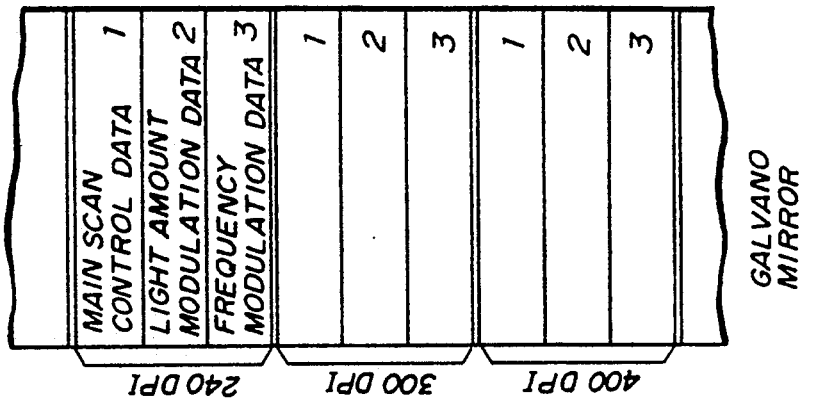
Figure 9B:
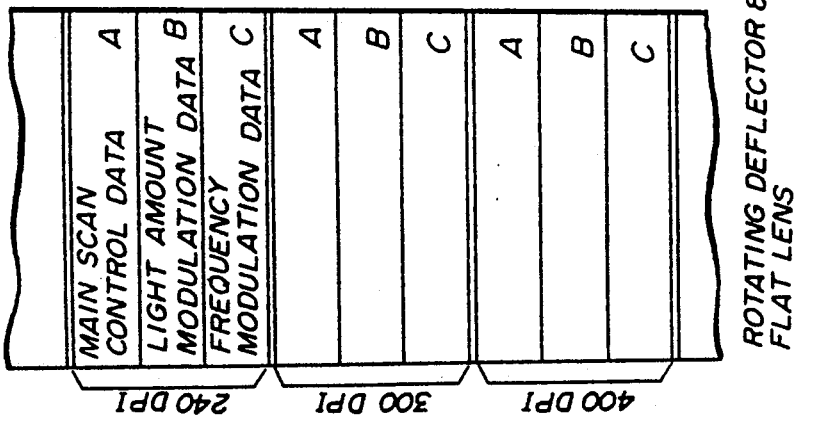
Figure 9A:
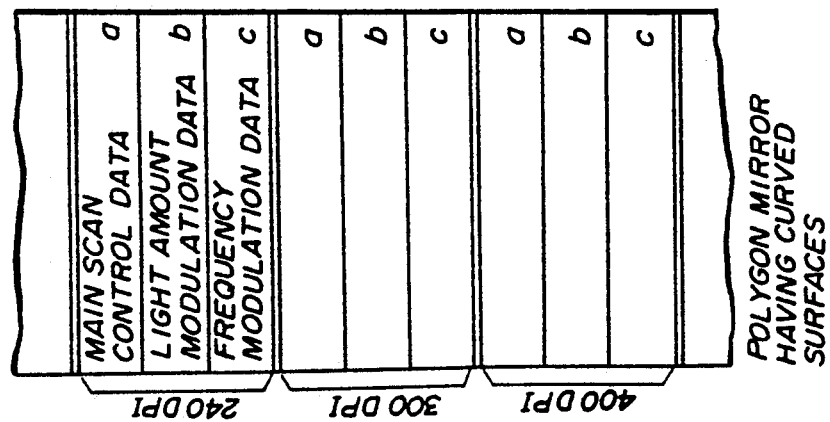

That is, as shown in FIG. 12, the main scan control data is read out from the RAM 35 in synchronism with the fall of the timing signal T0, and the light amount modulation data is read out therefrom in synchronism with the fall of the timing signal T1. Further, the frequency modulation data is read out from the RAM 35 in synchronism with the fall of the timing signal T2. The timing signals T0, T1 and T2 are respectively obtained by dividing one cycle of the timing signal $\phi$ into three, and are mutually one period out of phase. The clock signal OSC is supplied to a tap selector 64, which generates the reference clock signal CLKo therefrom in synchronism with the fall of the beam detection signal DETP supplied from the synchronization detection sensor 111 shown in FIG. 6.

A phase-locked loop (PLL) circuit 65 is composed of the frequency dividers 58 and 59, a phase comparator 61, a voltage controlled oscillator 62 and a lowpass filter 68 provided outside of the LSI 21. The PLL circuit 65 is reset by the beam detection signal DETP, and generates the pixel clock signal WCLK having a multiplication of the frequency of the PLL reference signal CLKA. A frequency divider 63 frequency divides the frequency of the pixel clock signal WCLK to thereby generate the main scan control clock SCLK.

Figure 1:
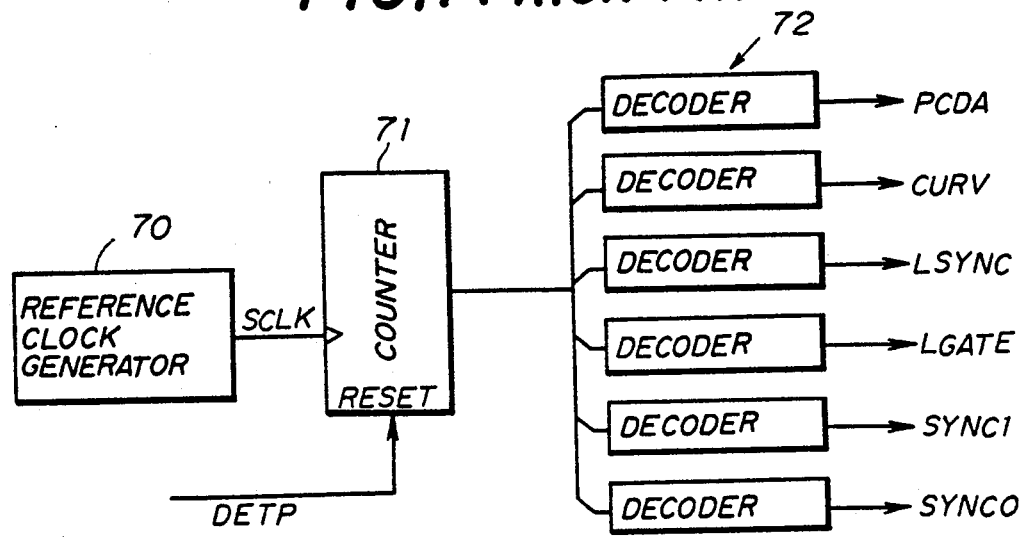
FIG. 1 is a block diagram of a conventional circuit which generates timing signals necessary for a main scan by a laser beam.
Figure 2:
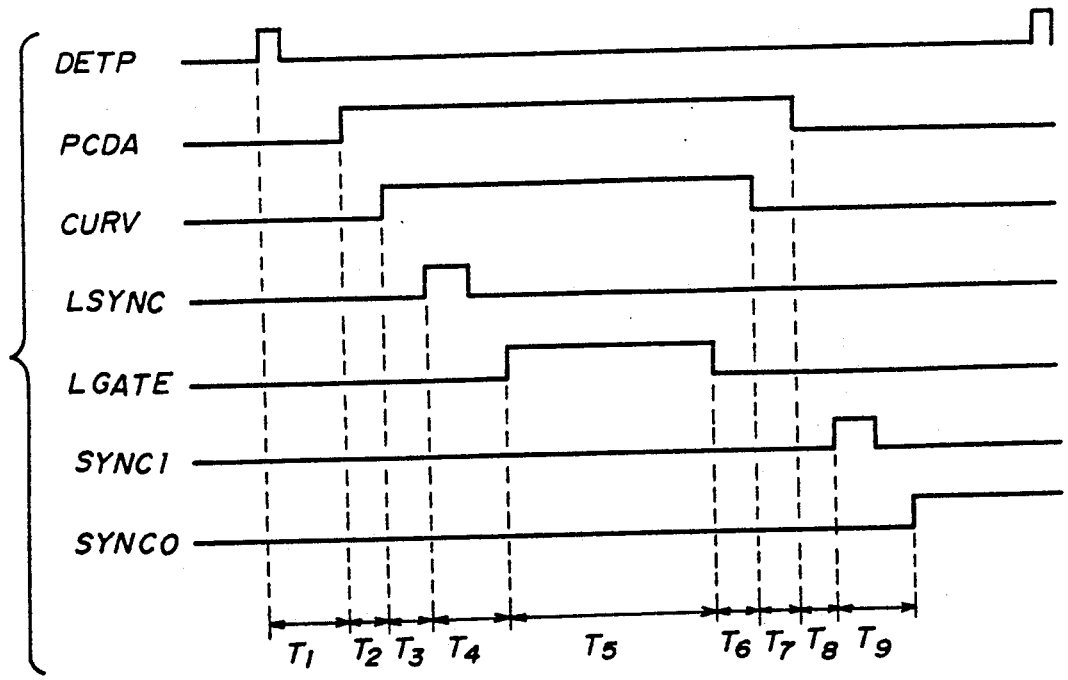
FIG. 2 is a timing chart illustrating the relationship among a timing signals generated by the circuit shown in FIG. 1.

A description will now be given of the main scan controller 51 (FIG. 11) and the main scan control data. The main scan control data is basic data necessary to generate a main scan synchronization signal LSYNC related to the main scan in the direction B starting from a position indicated by the beam detection signal DETP, a main scan image area designation signal LGATE, and the aforementioned timing signals PCDA, CURV, SYNC1 and SYNC0. The main scan control data shows the intervals between adjacent timing signals on the time base, that is, the periods T1-T9 shown in FIG. 2. In actuality, the main scan control data has count values (DS1, DS2, DS3, ...) obtained by counting the number of main scan control clocks SCLK for the periods T1-T9. It will be noted that the periods T1-T9 are variable in the embodiment of the preset invention.

Figure 14:
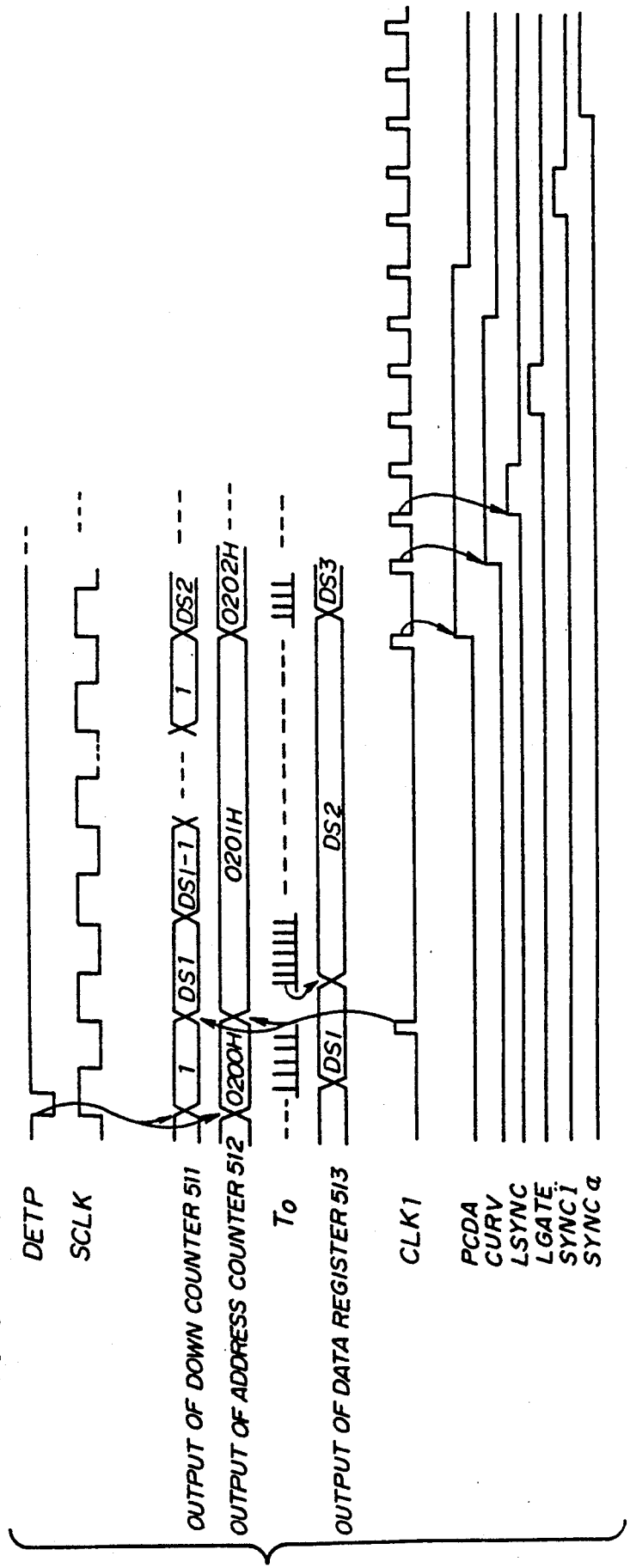
FIG. 14 is a time chart illustrating the operation of the main scan controller shown in FIG. 13.

As shown in FIG. 13, the main scan controller 51 is composed of an address counter 511, a down counter 512, a data register 513, a sequencer 514 and a prescaler 515. It will be noted that the ROM 30 illustrated in FIGS. 7 and 10 is also illustrated in FIG. 13. During the initialization procedure which is carried out after the power supply is turned ON, the CPU 33 selects one of the data groups stored in the ROM 30 shown in FIGS. 9A-9D on basis of the status of the dipswitch group 31, necessary data in the ROM 30 and instruction signals from other blocks. Then, as shown in FIG. 14, main scan control data DS1 is read out from the RAM 35 in synchronism with the timing signal T0 immediately after the fall of the beam detection signal DETP is written into the data register 513, and then loaded into the down counter 512.

Figure 15:
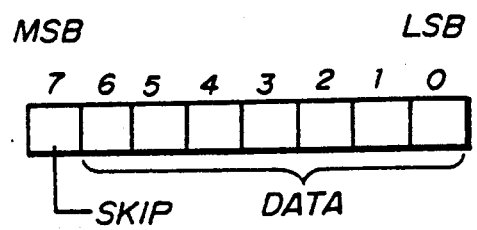
FIG. 15 is a diagram illustrating a format of the main scan control data stored in the RAM shown in FIG. 10.

The main scan control data is one-byte data, and has a format shown in FIG. 15. Bits 6–0 of the main scan control data form the aforementioned count value (DS1, DS2, . . . ) are read out from the RAM 35 and loaded into the down counter 512 via the data register 513. The down counter 512 counts down the loaded data (count value) DS1 which serves as an initial value. Bit 7 which is the most significant bit MSB of the main scan control data indicates whether or not a skip should be carried out. The MSB is latched in the prescaler 515 and the sequencer 514 (FIG. 13) at the same time as the other bits. When the MSB latched in the prescaler 515 is equal to "1", the prescaler 515 prescales the main scan control clock SCLK (that is, divides the frequency of the clock SCLK into 128). When the MSB is equal to "0", the value indicated by bits 6–0 is counted down in synchronism with the main scan control clock SCLK itself. On the other hand, when the MSB is equal to "1", the value indicated by the bits 6–0 is counted down in synchronism with the clock obtained by dividing the main scan control clock SCLK into 128, so that the clock CLK1 is generated by the down counter 512.

The MSB (skip) latched in the sequencer 514 instructs the sequencer 514 to neglect the next input of the clock CLK1. Thus, even if the interval between status changes of the signals generated by the sequencer 514 (which will be described in detail later) is equal to or longer than a period amounting to 128 clocks of the clock signal SCLK, it is possible to express the above such interval by setting the MSB to "1".

The down counter 512 generates the clock CLK1 when the down counting is over. The content of the address counter 511 is incremented by 1 in response to the clock CLK1, and outputs the renewed (incremented) address to the RAM 35. Main scan control data specified by the renewed address DS2 is read out from the RAM 35 in synchronism with the timing signal T0 and then written into the data register 513. Then, the main scan control data DS2 is read out from the data register 513 and loaded into the down counter 512. The down counter 512 counts down the data DS2 in synchronism with the main scan control clock SCLK.

After that, when the down counting of the counter 512 is over again, the clock signal CLK1 is generated and the address value in the address counter 511 is incremented by 1 so that the address value to be supplied to the RAM 35 is renewed.

Then, main scan control data DS3 specified by the renewed address is read out from the RAM 35 in synchronism with the timing signal T0 and then written into the data register 513, and is loaded into the down counter 512. The loaded data DS3 is counted down in synchronism with the main scan control clock SCLK.

In the above-mentioned manner, the clock CLK1 is generated and counted by the sequencer 515, which generates the timing signals PCDA, CURV, LSYNC, LGATE, SYNC1 and SYNC0. According to the main scan controller 51, by varying the main scan control data (count data indicating the aforementioned periods (intervals) T1–T9 shown in FIG. 2 which are to be written into the RAM 35), it becomes possible to alter the timings at which the timing signals change their status.

Some of the timing signals, such as the signal CURV are supplied to the light amount modulator 52 and the frequency modulator 53 shown in FIG. 11.

Figure 16:
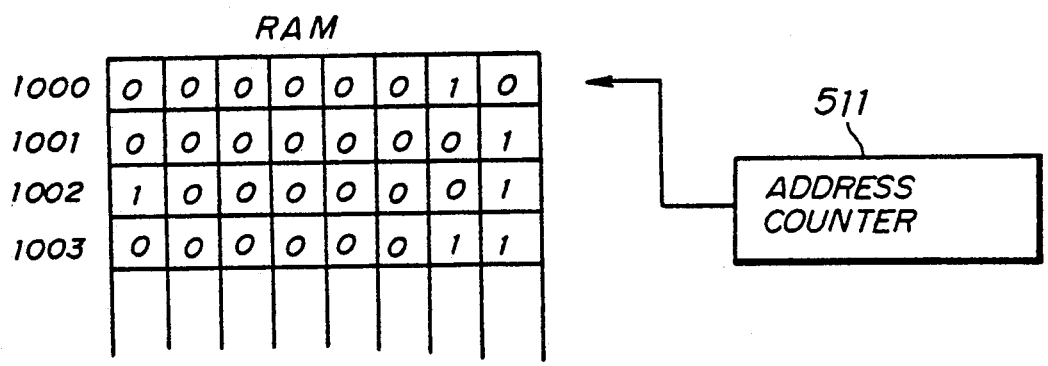
FIGS. 16 and 17 are diagrams illustrating the operation of the main scan controller shown in FIG. 11.
Figure 17:
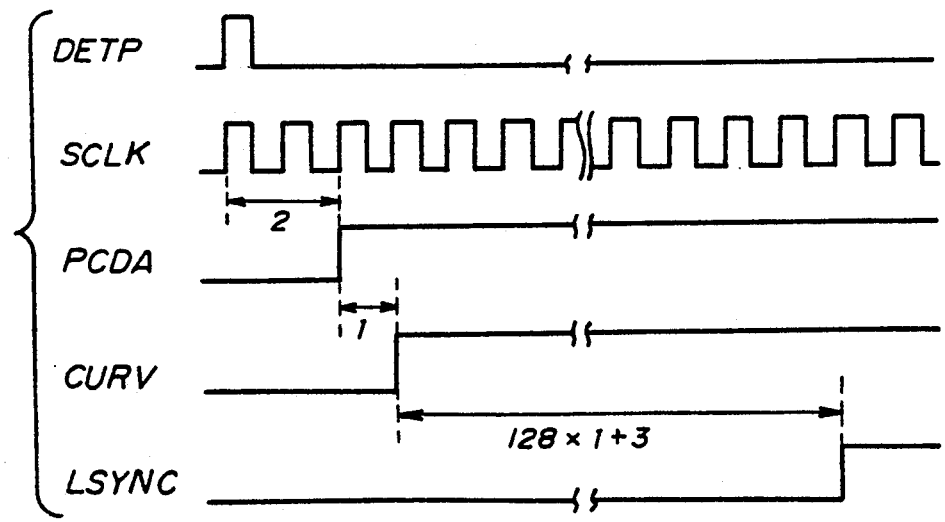

A description will now be given of a case where even when the intervals or periods between the status changes of the timing signals generated by the sequencer 514 are equal to or longer than a period amounting to 128 clocks of the clock signal SCLK, it is possible to express such periods by setting the MSB to "1∞, by referring to FIGS. 16 and 17. FIG. 16 illustrates main scan control data which is stored in a series of storage areas starting from address 1000.

The MSB of the 8-bit main scan control data specified by address 1000 is equal to "0". Thus, the PCDA signal rises two clocks of the signal SCLK after the rise of the beam detection signal DETP in accordance with the values of the bits 6–0. In the same way, the MSB of the main scan control data specified by address 1001 is equal to "0", the signal CURV rises one clock of the signal SCLK after the rise of the signal PCDA in accordance with the values of the bits 6–0.

The MSB of the main scan control data specified by address 1002 is equal to "1". Thus, only the content of the address counter 511 is incremented when 128×1 clocks of the signal SCLK are generated after the rise of the signal CURV in accordance with the values of the bits 6–0 while the signal LSYNC does not change. The signal LSYNC rises when three clocks of the signal SCLK are generated after the content of the address counter 511 is incremented, or 128×1+3 clocks after the rise of the signal CURV signal.

A description will now be given of the light amount modulator 52 and the light amount modulation data with reference to FIGS. 18, 19 and 20. The light amount modulation data is used for changing the amount of light emitted from the laser diode on the basis of the upper limit of the light amount which is written into the internal register (FIG. 11) of the exposure controller 34 by the CPU 33 (FIG. 10).

Figure 19:
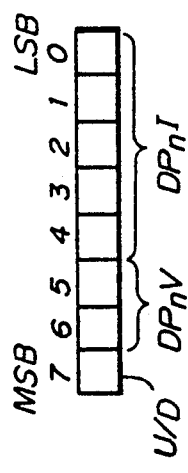
FIG. 19 is a diagram illustrating a format of the light amount modulation data stored in the RAM.

As shown in FIG. 19, the light amount modulation data is composed of eight bits, more specifically, one-bit data U/D, two-bit data DPnV and five-bit data DPnI. The data DPnV indicates a damage in the amount of light emitted from the laser diode. The data U/D indicates whether the amount of light should be increased or decreased by the data DPnV. The data DPnI indicates an interval at which the amount of light is changed.

Figure 18:
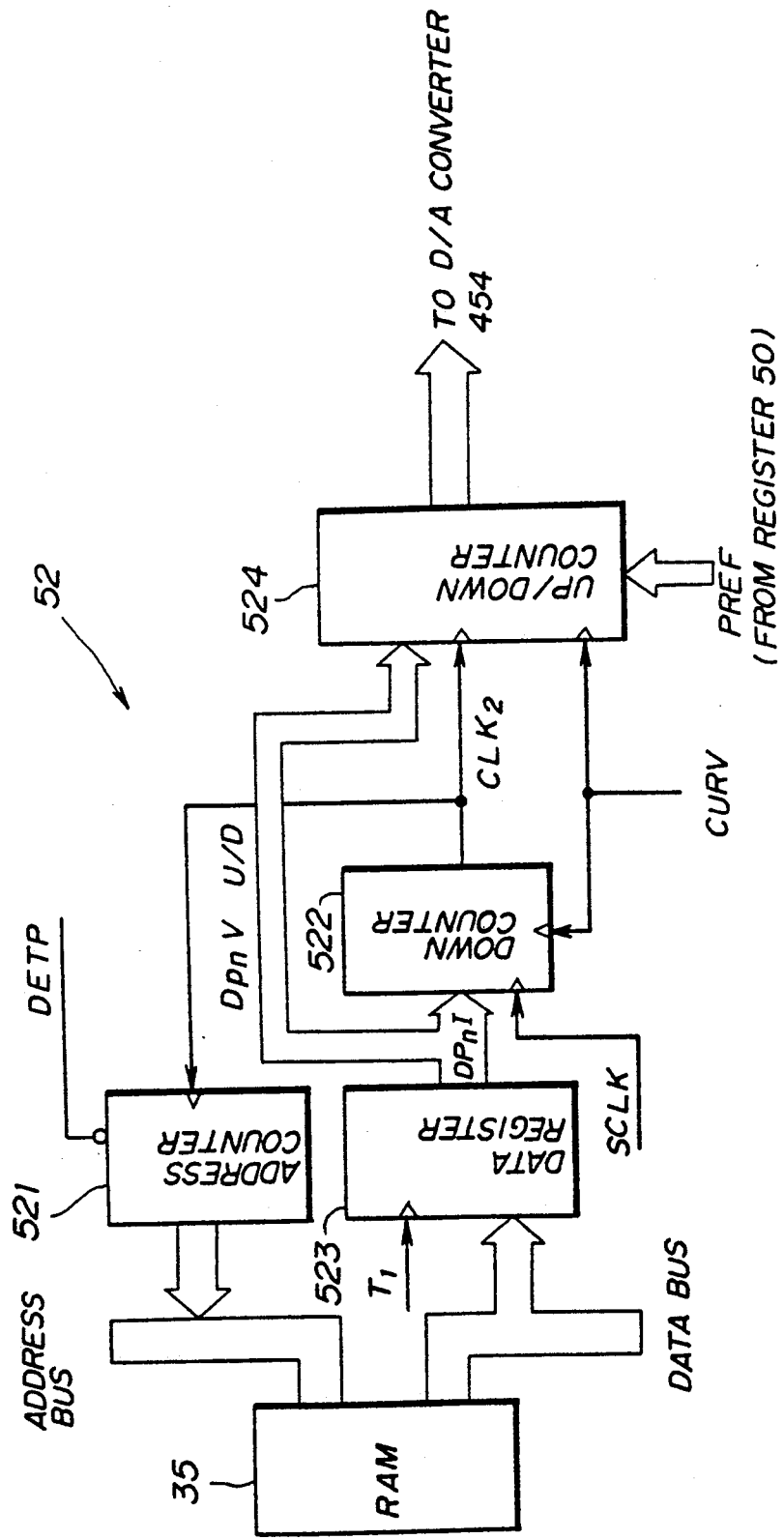
FIG. 18 is a diagram illustrating the structure of a light amount modulator shown in FIG. 11.

As shown in FIG. 18, the light amount modulator 52 is composed of an address counter 521, a down counter 522, a data register 523 and an up/down counter 524.

Figure 20:
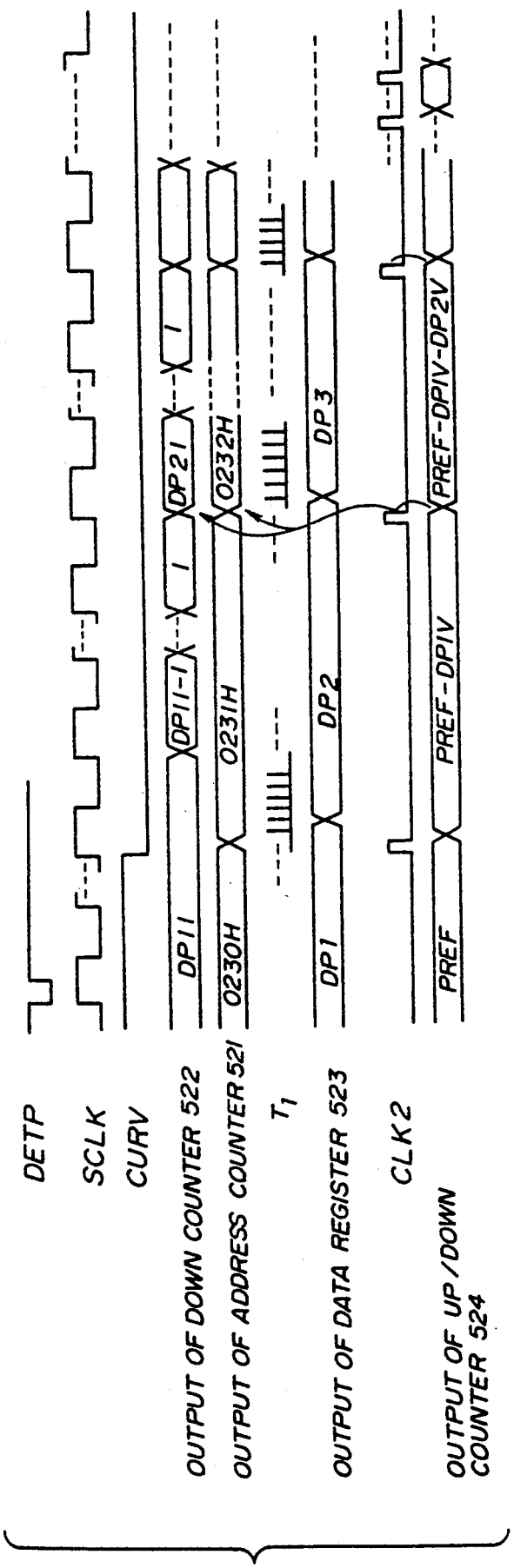
FIG. 20 is a time chart illustrating the operation of the light amount modulator shown in FIG. 18.

As shown in FIG. 20, light amount modulation data DP1 is read out from the RAM 35 in synchronism with the timing signal T1 obtained immediately after the fall of the beam detection signal DETP, and then written into the data register 523. Then, interval data (component) DP1I is read out from the data register 523 and loaded into the down counter 522.

Figure 21:
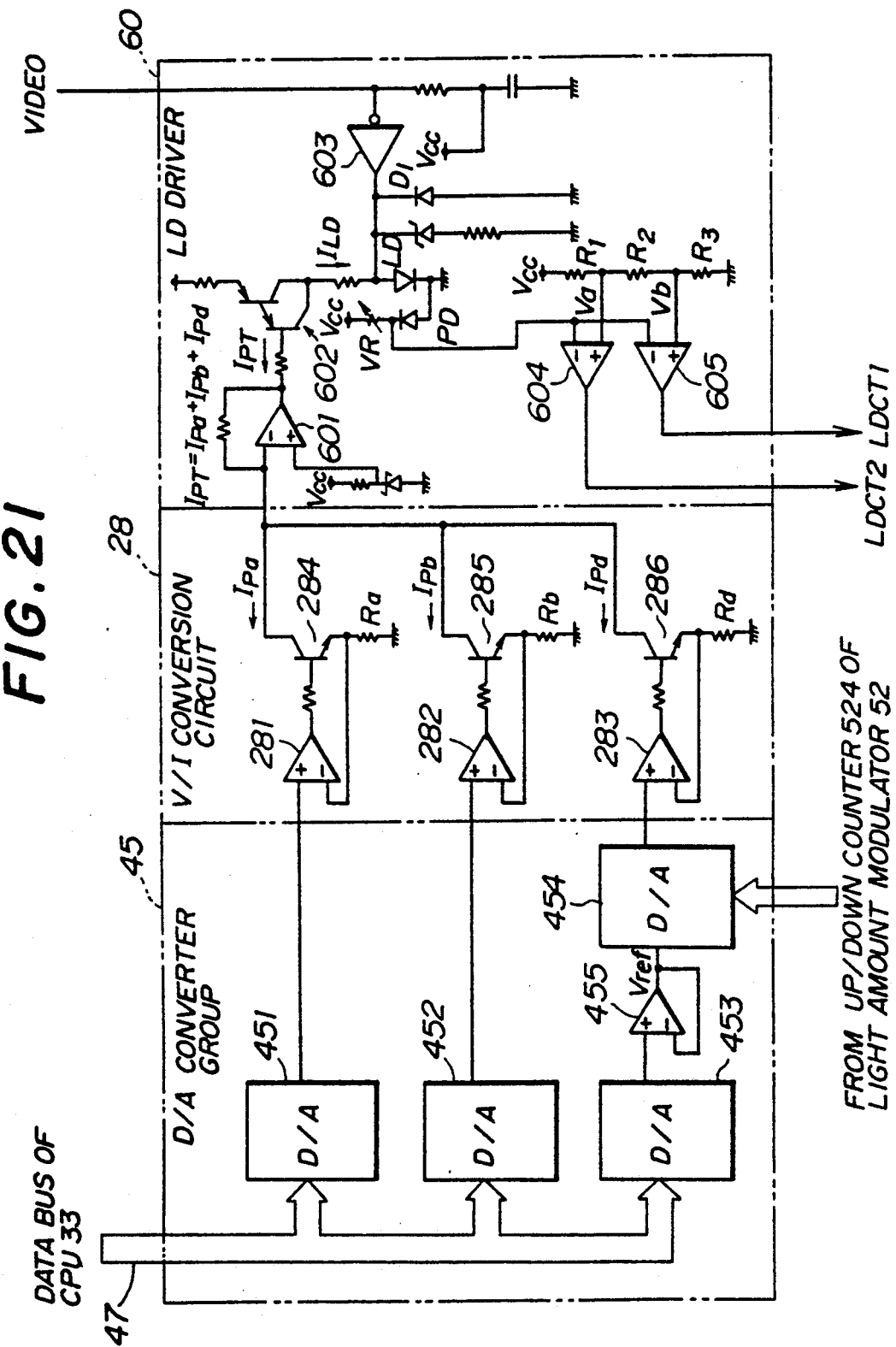
FIG. 21 is a circuit diagram illustrating an LD driver shown in FIG. 6 and its associated circuits.

While the signal CURV generated by the main scan controller 51 is at a high level, data PREF indicating the upper limit amount of light emitted from the laser diode written into the internal register 50 of the exposure controller 34 by the CPU 33 is output from the up/down counter 524 to a D/A converter 454 of a D/A converter group 45 (which will be described later with reference to FIG. 21). On the other hand, when the signal CURV is at a low level, the down counter 522 is allowed to generate a clock CLK2, and the up/down counter 524 changes its output by a value indicated by the data DP1V contained in the light amount modulation data DP1 in accordance with the data U/D. If the data U/D instructs a down count, for example, the up/down counter 524 outputs PREF-DP1V.

The address counter 521 increments the address value by in response to the clock CLK2 so that the address value applied to the RAM 35 is renewed. Data DP2 specified by the renewed address value is read out from the RAM 35 in synchronism with the timing signal T1 and then written into the data register 523. After that, an interval component DP2I contained in the data DP2 is loaded into the down counter 522, which is counted down in synchronism with the main scan control clock SCLK.

When the down counting of the down counter 522 becomes over, it generates the clock CLK2, and the up/down counter 524 changes its output by DP2V indicative of a change of the amount of light contained in the data DP2 in accordance with the up/down indication data U/D. If the data U/D indicates the down count, the up/down counter 524 outputs PREF-DP1V-DP2V.

At the same time, the address value in the address counter 521 is incremented so that the address value supplied to the RAM 35 is renewed. That is, the address value supplied to the RAM 35 is incremented by 1. Data DP3 read out from the RAM 35 by the renewed address value in synchronism with the timing signal T1 is written into the data register 523. Then, an interval component DP3I contained in the data DP3 is loaded into the down counter 522, which is counted down in synchronsim with the main scan control clock SCLK.

In the above-mentioned way, the output signal of the up/down counter 524 is changed each time the clock CLK2 is generated, so that the amount of light emitted from the laser diode is adjusted.

A further description will now be given of the LD driver 60, the D/A converter group 45 and the voltage/current conversion circuit 28 with reference to FIG. 21. The D/A converter group 45 is provided in the LSK 21 as shown in FIG. 10, and composed of four D/A converters 451-454, and an operational amplifier 455 which functions as an impedance converter. Each of the D/A converters 451-453 has an eight-bit structure, and is connected to the data bus 47 shown in FIG. 10. The CPU 33 directly controls the D/A converters 451-453.

The D/A converter 454 has an input terminal connected to the output terminal of the operational amplifier 455 and the output terminal of the up/down counter 524 (FIG. 11) of the light amount modulator 52 in the exposure controller 34 shown in FIG. 13.

The outputs of the D/A converters 451, 452 and 454 are input to transistors 284-286 via operational amplifiers 281-283 of the voltage/current conversion circuit 28. The D/A converters 451-453 convert the respective digital values into corresponding analog output voltages, which are then converted into currents Ipa, Ipb and Ipd by the voltage/current converter 28, respectively.

The D/A converter 453 converts the digital value set by the CPU 33 into a corresponding analog voltage. The operational amplifier 455 serving as the impedance converter receives the analog voltage applied by the D/A converter 453 and generates a reference input voltage Vref which is to be applied to the D/A converter 454.

A current $I_{PT}$ which is the sum of the currents Ipa, Ipb and Ipd is supplied from the voltage/current conversion circuit 28 to the LD driver 60. An operational amplifier 601 of the LD driver 60 amplifies the current $I_{PT}$, and a power transistor 602 causes a drive current $I_{LD}$ corresponding to the current $I_{PT}$ to pass through a laser diode LD. Thereby, the amount of light emitted from the laser diode LD is adjusted.

Figure 22:
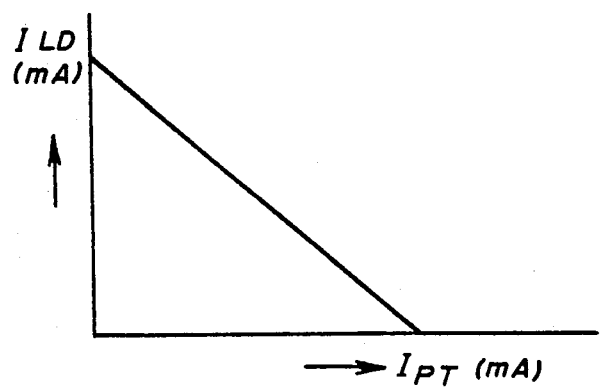
FIG. 22 is a graph illustrating the relationship between a drive current and a control current related to the LD driver shown in FIG. 21.

As shown in FIG. 22, the currents $I_{PT}$ and the drive current $I_{LD}$ have a relationship described by a linear function having a negative gradient. Thus, by changing the digital input values to the D/A converters 451-454, it becomes possible to control the drive current $I_{LD}$.

The ON/OFF control of the laser diode LD is carried out on the basis of the video signal VIDEO supplied from the video controller 57 shown in FIG. 11 via an inversion circuit 603. That is, when the video signal VIDEO is at a high level, the output of the inversion circuit 603 is at a low level. Thus, the anode of the laser diode LD is grounded via a diode D1 and the laser diode LD is OFF. On the other hand, when the video signal VIDEO is at a low level, the output of the inversion circuit 603 is at a high level. Thus, the drive current $I_{LD}$ from the power transistor 602 passes through the laser diode LD. Thus, the laser diode LD is ON and emits the laser beam.

The amount of light emitted from the laser diode LD is detected by a photodiode PD for use in monitor, which outputs a detection voltage corresponding to the amount of light emitted from the laser diode LD. The detection voltage, which can be adjusted by a variable resistor VR, is compared with reference voltages Va and Vb by comparators 604 and 605, respectively. The comparison results output from the comparators 604 and 605 are sent, as binary signals LDCT1 and LDCT2, to the exposure controller 34.

Figure 23:
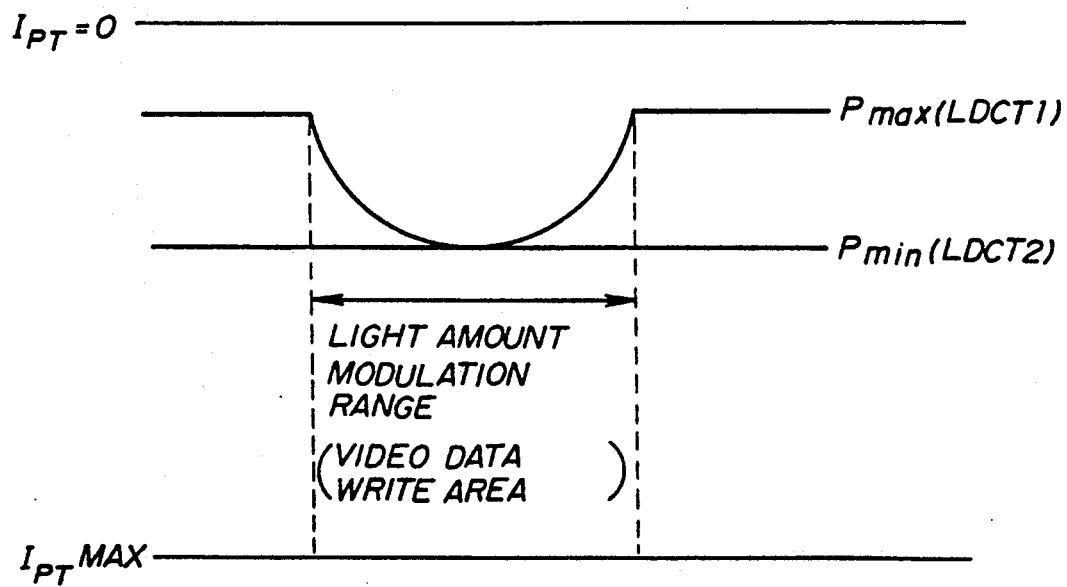
FIG. 23 is a diagram illustrating a change of the amount of light emitted from the laser diode in a light amount modulation area.

The reference voltages Va and Vb are based on registers R1, R2 and R3 and change as shown in FIG. 23

The exposure controller 34 has an APC interrupt function. The APC interrupt is generated by writing the corresponding data into the internal register 50 of the exposure controller 34 (FIG. 11). At this time, the video signal VIDEO becomes active, and thus the laser diode LD starts to emit the laser beam.

After that, the exposure controller 34 generates the interrupt signal INT to the CPU 33, and causes the latch circuit 66 to latch the binary signals LDCT1 and LDCT2 at the same time, which are then written into the internal register 50.

The CPU 33 reads the values of the signals LDCT1 and LDCT2 in an interrupt processing routine, and changes the digital input values addressed to the D/A converters 451-453 on the basis of the values of the signals LDCT1 and LDCT2. In this manner, the amount of light emitted from the laser diode LD is controlled.

The D/A converter 451 roughly controls the amount of light emitted from the laser diode LD, and on the other hand, the D/A converter 452 precisely controls the amount of light emitted therefrom. By selecting the resistance values of the resistors Ra and Rb in the voltage/current conversion circuit 28, the amount of variation in the current $I_{PT}$ per 1LSB is adjusted.

For example, when the resistance values of the resistors Ra and Rb are designed so that 1LSB of the D/A converter 451 is equal to 255 LSB of the D/A converter 452, it is possible to substantially provide an A/D converter capable of processing a maximum of 16 bits.

Figure 24:
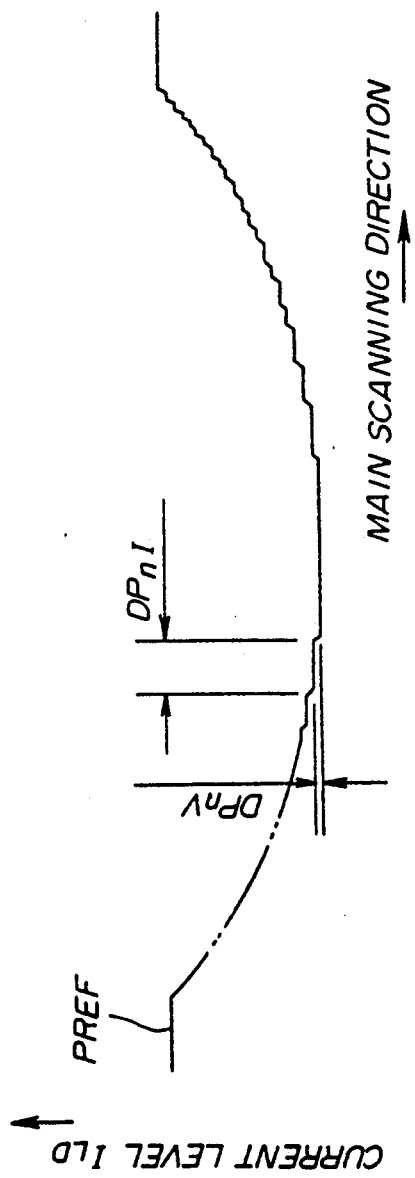
FIG. 24 is diagram illustrating a distribution of the level of the drive current $I_{LD}$ of the laser diode.

Further, the light amount modulation data output by the up/down counter 524 in the light amount modulator 52 shown in FIG. 18 is input to the D/A converter 454, which carries out the light amount modulation control of the laser diode LD. That is, when the video signal shows all of dots contained in one line should be recorded, the drive current $I_{LD}$ of the laser diode LD shows a current level distribution in the main scanning direction as shown in FIG. 24 in accordance with the output of the up/down counter 524.

The light amount reference data PREF indicates a current level corresponding to the upper limit of the the amount of light emitted from the laser diode LD. A reference $\pm DPnV$ (n=1, 2, 3, ...) is data which is described in the data DPn and which changes the light amount. Symbol '+' shows that the drive current $I_{LD}$ is increased by DPnV, and symbol '−' shows that the drive current $I_{LD}$ is decreased by DPnV. The interval component DPnI of the data DPn designates the interval at which the drive current $I_{LD}$ is changed. For example, when the number of pulses of the main scan control clock SCLK corresponding to DPnI is generated, the level of the drive current $I_{LD}$ is increased or decreased by DPnV.

A description will now be given of the frequency modulator 53 (FIG. 11), the frequency modulation data and the PLL circuit 65 (FIG. 11), with reference to FIGS. 25, 26 and 27.

The frequency modulation data is used for changing the frequency of the PLL reference signal CLKA on the basis of reference frequency data FINT of the PLL reference signal CLKA written into the internal register 50 of the exposure controller 34 by the CPU 33 shown in FIG. 10.

As shown in FIG. 26, the modulation frequency data is composed of one byte, and has two-bit data DFmV indicative of the amount of a change of the frequency of the PLL reference signal CLKA, one-bit data U/D indicative of the direction in which the frequency thereof is increased or decreased, and five-bit data DFmI indicating an interval at which the frequency thereof is changed.

Figure 25:
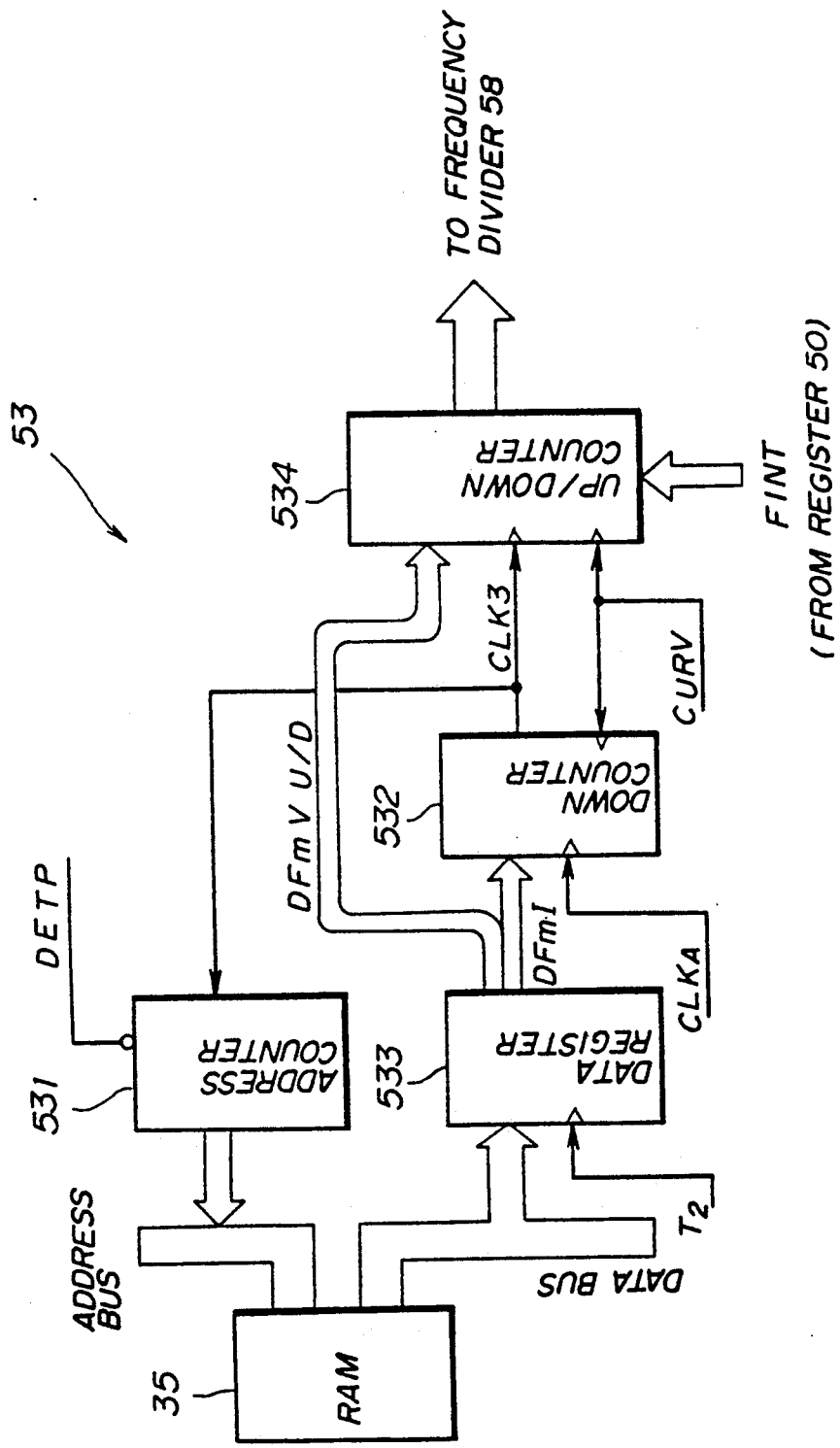
FIG. 25 is a block diagram of the structure of a frequency modulator shown in FIG. 11.

As shown in FIG. 25, the frequency modulator 53 is composed of an address counter 531, a down counter 532, a data register 533 and an up/down counter 534. The frequency modulator 53 outputs data designating the frequency of the PLL reference signal CLKA to the frequency divider 48 shown in FIG. 11, and has the frequency divider 58 generate the PLL reference signal CLKA having the designated frequency.

The frequency divider 58 is formed of, for example, a down counter. When this down counter counts the number of pulses of the reference clock signal CLKo which is designated by the frequency modulator 53, it outputs a pulse having a time duration amounting to 10 pulses of the reference clock CLKo. This operation is repeatedly carried out, so that the PLL reference signal CLKA is obtained.

When there is no change of the frequency data given by the frequency modulator 53, the PLL reference signal CLKA having the fixed pulse duration and a constant period is output. On the other hand, when the frequency modulator 53 changes the frequency data, the PLL reference signal CLKA having the fixed pulse duration but a changed period is output.

As shown in FIG. 27, frequency modulation data DF1 is read out from the RAM 35 immediately after the fall of the beam detection signal DETP and then written in the data register 533, and an interval component DF1I of the data DF1 is loaded into the down counter 532.

While the signal CURV generated and output by the main scan controller 51 (FIG. 11) is at the high level, the up/down counter 534 provides the frequency divider 58 with the reference frequency data FINT of the PLL reference signal CLKA written into the internal register 50 of the exposure controller 34 by the CPU 33. On the other hand, while the signal CURV is at the low level, the down counter 532 generates a clock CLK3, and the up/down counter 534 changes its output by DF1V contained in the frequency modulation data DF1 in accordance with the data U/D. For example, if the data U/D indicates the down count, the up/down counter 534 outputs FINT-DF1V.

The address value in the address counter 531 is incremented in response to the clock CLK3, so that the address value to be supplied to the RAM 35 is renewed, that is, incremented by 1. In synchronsim with the timing signal T2, frequency modulation data DF2 specified by the incremented address value is read out from the RAM 35. Then, an interval component DF2I of the data DF2 is loaded into the down counter 532, which is counted down by the down counter 532 in synchronism with the PLL reference signal CLKA.

The counting of the down counter 532 becomes over, it outputs the clock CLK3, and the up/down counter 534 changes its output by the data DF2V contained in the frequency modulation data DF2 in accordance with the data U/D. For example, if the data U/D indicates the down count, the up/down counter 534 outputs FINT-DF1V-DF2V to the frequency divider 58. At the same time, the address value in the address counter 531 is incremented, so that the address value is renewed, that is, incremented.

In synchronism with the timing signal T2, frequency modulation data DF3 specified by the renewed address value is read out from the RAM 35 and then written into the data register 533. After that, an interval component DF3I contained in the data DF3 is loaded into the down counter 532, which is counted down in synchronism with the PLL reference signal CLKA.

In the above-mentioned way, the output of the up/down counter 534 supplied to the frequency divider 58 is increased or decreased in response to the clock signal CLK3, so that the PLL reference signal CLKA is modulated. Thus, the frequency of the PLL reference signal CLKA generated by the frequency divider 58 is also changed.

Figure 28:
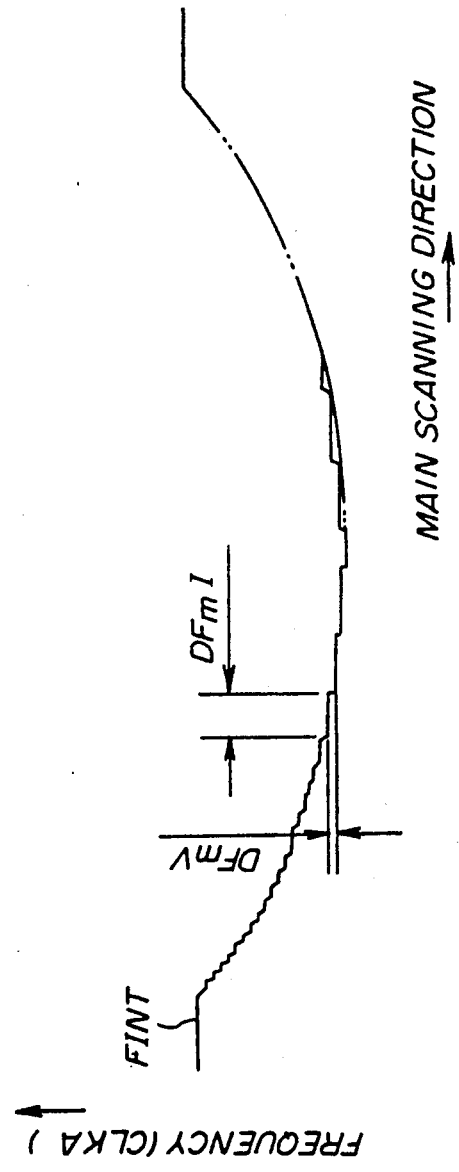
FIG. 28 is a diagram illustrating a distribution of the frequency of a PLL reference signal in the main scanning direction generated by a frequency divider shown in FIG. 11.

As described above, the frequency modulator 53 and the frequency divider 58 cooperate with each other, and as shown in FIG. 28, the frequency of the PLL reference signal CLKA is changed. FIG. 28 shows a frequency modulation distribution obtained in the main scanning direction defined by the frequency modulation data written into the RAM 35 and the reference frequency data FINT of the PLL reference signal CLKA. A reference $\pm DFmV$ (m=1, 2, 3, ...) denotes data which indicates how much the frequency is changed and which is described in the data DFm. Symbol '+' shows that the frequency is increased by DFmV, and symbol '−' shows that the frequency is decreased by DFmV. The interval component DFmI of the data DFm designates the interval at which the frequency is changed. For example, when the number of pulses of the main scan control clock SCLK corresponding to DFmI is generated, the frequency is increased or decreased by DFmV.

Turning now to FIG. 11, the PLL reference signal CLKA generated and output by the frequency divider 58 is input to the phase comparator 61, which is a part of the PLL circuit 65. The voltage controlled oscillator 62 of the PLL circuit 65 supplies the video controller 57 with the pixel clock signal WCLK synchronized with the PLL reference signal CLKA. The video controller 57 outputs, to the LD driver 60, video data from the data controller 13 in serial form in synchronism with the pixel clock signal WCLK.

As described hereinbefore, the current having a distribution as shown in FIG. 24 is supplied to the laser diode LD by the cooperation of the light amount modulator 52 and the frequency modulator 53 as well as the light amount modulation data and the frequency modulation data which are read out from the ROM 30 and which are selectively written into the RAM 35 under the control of the CPU 33.

The frequency of the pixel clock signal WCLK is obtained by multiplying the frequency of the PLL reference signal CLKA has a frequency distribution as shown in FIG. 28. In synchronism with the pixel clock signal WCLK, dots contained in one line are recorded.

It will be noted that an arbitrary current level distribution and an arbitrary frequency distribution can be obtained by altering the light amount modulation data and the frequency modulation data. In the above-mentioned embodiment of the present invention, the optical scan characteristic compensating data are provided respectively for the four different optical scan units, as illustrated in FIGS. 9A through 9D, and the optical scan characteristic compensating data related to any one of the optical scan units can be specified by the dipswitch group 31. It will be noted that the scanning areas related to the different optical scanning units may not coincide with each other. From this point of view, main scan control data are provided respectively for the optical scan units and stored in the ROM 30.

The present invention is not limited to the specifically disclosed embodiment, and variations and modifications may be made without departing from the scope of the present invention.

What is claimed is:

1. An image recording apparatus comprising:
   an image recording media;
   an optical scanning system which projects a light beam corresponding to an image to be recorded onto said image recording media and which records said image on said image recording media, said optical scanning system actually provided in said image recording apparatus being one optical scanning system selected from among predetermined different optical scanning systems;
   first memory means for storing a plurality of sets of control data respectively provided for said predetermined different optical scanning systems;
   setting means, coupled to said first memory means, for specifying one of said predetermined different optical scanning systems provided in said image recording apparatus;
   second memory means, coupled to said first memory means and said setting means, for reading out one of the sets of control data corresponding to said optical scanning system selected from among said predetermined different optical scanning systems and for storing said one of the sets of control data;
   main scan controller means, coupled to said second memory means, for generating predetermined timing signals related to said one of the sets of control data stored in said second memory means; and
   control means, coupled to said optical scanning system, said second memory means and said main scan controller means, for generating a control signal from said one of the sets of control data and said predetermined timing signals and for controlling said optical scanning system on the basis of said control signal so that said optical scanning system actually provided in said image recording apparatus has an optical characteristic based on said one of the sets of control data related to said optical scanning system actually provided in said image recording apparatus.

2. An image recording apparatus as claimed in claim 1, wherein:
   said optical scanning means comprises a laser diode, and said second memory means stores, as said control data, main scan control data respectively provided for said predetermined different optical scanning systems, said main scan control data being used for moving said light beam in a main scanning direction and for recording said image in a recording area; and
   said image recording apparatus comprises means for generating a main scan control clock defining a timing of a main scan by said light beam, and
   wherein said timing signal generating means comprises:
   address counter means for suppling said second memory means with an address signal specifying said one of the sets of control data related to said optical scanning system actually provided in said image recording apparatus;
   data register means, coupled to said address counter means, for temporarily storing said one of the sets of control data specified by said address counter means at a predetermined timing before said optical scanning system starts to the main scan;
   counter means, coupled to said data register means, for counting an initial count value contained in said one of the sets of control data in synchronism with said main scan control clock and for outputting a count signal when said counter means overflows;
   prescaler means, coupled to said counter means, for selectively prescaling said main scan control clock when prescale data contained in said one of the sets of control data indicates that said main scan control clock should be prescaled, a prescaled main scan control clock being supplied to said counter means in place of said main scan control clock; and
   sequencer means, coupled to said data register and said counter means, for generating said timing signals based on the count signal and said skip data.

3. An image recording apparatus as claimed in claim 2, wherein said counter means comprises a down counter.

4. An image recording apparatus as claimed in claim 1, wherein:
   said optical scanning means comprises a laser diode;
   means for generating a main scan control clock defining a timing of a main scan by said light beam; and
   said second memory means stores, as said control data, light amount modulation data respectively provided for said predetermined different optical scanning systems, said light amount modulation data being used for changing an amount of said light beam emitted from said laser diode, and
wherein said control means comprises:
address counter means for suppling said second memory means with an address signal specifying said one of the sets of control data related to said optical scanning system actually provided in said image recording apparatus;
data register means, coupled to said address counter means, for temporarily storing said one of the sets of control data specified by said address counter means at a predetermined timing before said optical scanning system starts to the main scan;
first counter means, coupled to said data register means, for counting interval data contained in said one of the sets of control data in synchronism with said main scan control clock and for outputting a count signal when said counter means overflows, said interval data defining an interval at which the amount of the light beam is adjusted;
second counter means, coupled to said data register means and said first counter means, for outputting a count value which changes the amount of the light beam by a variation defined in said light amount modulation data stored in said data register means when said count signal is output by said first counter means; and
current control means, coupled to said second counter means, for changing a driving current which is to be applied to said laser diode on the basis of said count value output by said second counter means.

5. An image recording apparatus as claimed in claim 4, wherein said first counter means comprises a down counter means.

6. An image recording apparatus as claimed in claim 4, wherein said second counter means comprises an up/down counter which increases or decreases the amount of the light beam in accordance with count direction data contained in said light amount modulation data and registered in said data register means.

7. An image recording apparatus as claimed in claim 4, further comprising converter means for converting said count value in said second counter means into a corresponding analog signal, which is applied to said laser diode.

8. An image recording apparatus as claimed in claim 1, wherein:
said optical scanning means comprises a laser diode which turns ON/OFF in synchronism with a pixel clock signal;
means for generating a predetermined reference frequency signal on the basis of a counter value; and
said second memory means stores, as said control data, frequency modulation data respectively provided for said predetermined different optical scanning systems, said frequency modulation data being used for changing a frequency of a video signal representing said image to be recorded, and
wherein said control means comprises:
address counter means for suppling said second memory means with an address signal specifying said one of the sets of control data related to said optical scanning system actually provided in said image recording apparatus;
data register means, coupled to said address counter means, for temporarily storing said one of the sets of control data specified by said address counter means at a predetermined timing before said optical scanning system starts to the main scan;
first counter means, coupled to said data register means, for counting interval data contained in said one of the sets of control data in synchronism with said predetermined reference frequency signal and for outputting a count signal when said counter means overflows, said interval data defining an interval at which the frequency of said pixel clock signal is adjusted;
second counter means, coupled to said data register means and said first counter means, for outputting a count value which changes the frequency of said predetermined reference frequency signal by a variation defined in said frequency modulation data stored in said data register means when said count signal is output by said first counter means; and
pixel clock generating means, coupled to said second counter means, for generating said pixel clock signal having the frequency which changes in accordance with said variation in the frequency of said predetermined reference frequency signal.

9. An image recording apparatus as claimed in claim 8, wherein said pixel clock generating means comprises:
voltage-controlled oscillating means for a generating a frequency signal having a frequency which changes in accordance with a difference signal;
frequency divider means for dividing a frequency of said frequency signal and for outputting a frequency-divided signal; and
phase comparator means for comparing a phase of said frequency-divided signal with a phase of said predetermined reference frequency signal and for outputting said difference signal indicating a difference between the phase of said frequency-divided signal and the phase of said predetermined reference frequency signal, and
wherein said frequency signal generated by said voltage-controlled oscillator corresponds to said pixel clock signal.

10. An image recording apparatus as claimed in claim 8, wherein said first counter means comprises a down counter means.

11. An image recording apparatus as claimed in claim 8, wherein said second counter means comprises an up/down counter which increases or decreases the frequency of said pixel clock signal in accordance with count direction data contained in said frequency modulation data and registered in said data register means.

* * * * *